(12) United States Patent
Rubinstein et al.

(10) Patent No.: US 6,655,803 B1
(45) Date of Patent: Dec. 2, 2003

(54) WAVEFRONT METHOD FOR DESIGNING OPTICAL ELEMENTS

(75) Inventors: Jacob Rubinstein, Misgav (IL); Gershon Moshe Wolansky, Jerusalem (IL)

(73) Assignee: Inray Ltd., Upper Galilee (IL)

( * ) Notice: Subject to any disclaimer, the term of this patent is extended or adjusted under 35 U.S.C. 154(b) by 0 days.

(21) Appl. No.: 09/584,715

(22) Filed: Jun. 1, 2000

(51) Int. Cl.$^7$ ................................................ G02C 7/02
(52) U.S. Cl. ............................................... 351/177
(58) Field of Search ............................. 351/168–169, 351/159, 176, 177

(56) References Cited

U.S. PATENT DOCUMENTS

| | | | |
|---|---|---|---|
| 2,878,721 A | 3/1959 | Kanolt | 351/169 |
| 3,687,528 A | 8/1972 | Maitenaz | 351/169 |
| 4,613,217 A | 9/1986 | Fuerter et al. | 351/176 |
| 4,676,610 A | 6/1987 | Barkan et al. | 351/169 |
| 4,838,675 A | 6/1989 | Barkan et al. | 351/169 |
| 4,856,889 A * | 8/1989 | Guilino et al. | 351/169 |
| 5,771,089 A | 6/1998 | Barth | 351/169 |
| 5,784,144 A | 7/1998 | Kelch et al. | 351/169 |
| 5,886,766 A | 3/1999 | Kaga et al. | 351/169 |
| 5,992,998 A | 11/1999 | Pfeiffer et al. | 351/169 |
| 6,019,470 A | 2/2000 | Mukaiyama et al. | 351/169 |
| 6,082,856 A * | 7/2000 | Dunn et al. | 351/160 H |
| 6,302,540 B1 * | 10/2001 | Katzman et al. | 351/161 |
| 6,318,859 B1 * | 11/2001 | Baudart et al. | 351/169 |
| 6,366,823 B1 * | 4/2002 | Shirayanagi | 700/97 |
| 6,382,789 B1 * | 5/2002 | Baudart et al. | 351/177 |

OTHER PUBLICATIONS

J. Loos, Ph. Slusallek and H. P. Seidel, "Using Wavefront Tracking for the Visualization and Optimization of Progressive Lenses", Computer Graphics Forum, vol. 17, No. 3, 1998, pp. 255–264.

(List continued on next page.)

*Primary Examiner*—Jordan M. Schwartz
(74) *Attorney, Agent, or Firm*—Eitan, Pearl, Latzer & Cohen Zedek, LLP

(57) ABSTRACT

A method for designing a surface of an optical element includes the steps of prescribing initial wavefronts, selecting an initial parameterized representation of the surface, choosing a cost function in the parameters, and optimizing the cost function with respect to the parameters. The step of optimizing includes the steps of calculating a refracted wavefront for each of the initial wavefronts and analytically computing derivatives of the cost function. The method may also include the steps of precomputing eikonal functions between points in the vicinity of the initial wavefronts. Then the refracted wavefronts are calculated from the precomputed eikonal functions. A method for designing at least one surface of a multifocal optical element includes the step of concurrently considering in a design of the at least one surface any combination of an astigmatism distribution, a progressive power distribution and a prism distribution. When designing at least one surface of an optical element, a representation for each particular surface is created with a set of discrete points. Then for each discrete point in the set, nearest neighbor points from the set are selected, the particular surface is approximated in a vicinity of the discrete point by a polynomial of a predetermined order in two variables of the particular surface, and the coefficients of the polynomial are determined according to the selected nearest neighbor points without requiring continuity between polynomials for neighboring discrete points.

33 Claims, 8 Drawing Sheets

OTHER PUBLICATIONS

D. Malacara and Z. Malacara, "Testing and centering of lenses by means of a Hartmann test with four holes", Optical Engineering, 1992, vol. 31 No. 7, pp. 1551–1555.

J. Porill, J. P. Iyins and J. P. Frisby, "The variation of torsion with vergence and elevation", Vision Research, vol. 39, pp. 3934–3950 (1999).

J. Kneisly, "Local curvature of wavefronts in an optical system", JOSA 54, 1964, pp. 229–235.

O. N. Stavroudis, The Optics of Rays, Wavefronts and Caustics, Academic Press, 1972, pp. 200–207.

A. Wiener and Y. Yomdin, "From Formal Numerical Solutions of Elliptic PDE's to the True Ones", Mathimatics of Computation, vol. 69, No. 229, pp. 197–235, American Mathematical Soiety, 1999.

* cited by examiner

WAVEFRONT METHOD FOR DESIGNING OPTICAL ELEMENTS

BACKGROUND OF THE INVENTION

The present invention relates to the design of optical elements, in general, and to a method for designing optical elements using wavefront calculations, in particular.

Most of the designs for progressive (multifocal) ophthalmic lenses are based mainly on the geometrical shape of one or more of the lens surfaces, as described, for example in U.S. Pat. No. 3,687,528 to Maitenaz. The geometrical properties, however, are only indirectly related to the lens' actual optical performance. For example, the curvature of any of the lens surfaces is only approximately related to the lens optical power. In some cases, for example U.S. patent application Ser. No. 09/262,341 to Katzman et al., entitled "METHOD FOR THE DESIGN OF MULTIFOCAL OPTICAL ELEMENTS", filed Mar. 4, 1999, the design is examined for its actual optical performance, and parameters of the design process can be adjusted in response to the optical performance, but this makes the design process indirect and time-consuming.

Another typical approach in lens design is to use software means to trace a large number of rays through the lens and to deduce from the incident and refracted rays the classical aberrations of the lens. The surfaces of the lens are represented in terms of a fixed number of basic surfaces such as spheres, aspherics, torics and cylindrical surfaces. The ray tracing of a large number of rays requires a considerable computational effort, and the limited family of surfaces in which one optimizes the lens performance greatly restricts the optimization capabilities.

Several methods were proposed to overcome the undesirable constraint of a limited family of optical surfaces. U.S. Pat. No. 4,613,217 to Fueter et al. proposes to represent an optical surface by splines. U.S. Pat. No. 5,886,766 to Kaga et al. similarly proposes a progressive ophthalmic lens consisting of three portions, at least one of which is divided into smaller pieces that are connected together by requiring that the surface is at least twice continuously differentiable along the interfaces joining two pieces. The spline representation, while offering an advantage over the limited class of surfaces mentioned above, has several drawbacks: the strict smoothness requirements along boundaries limits the space of parameters for the optimization process, the restriction to rectangular pieces, and thus to rectangular domains, limits the flexibility of the design, and it is not fully natural to prescribe boundary conditions on the lens surfaces and their slopes. U.S. patent application Ser. No. 09/262,341 to Katzman et al. describes a finite element method for the surface representation. The finite elements are patches of arbitrary polygonal shape, thus yielding flexible designs. The method of U.S. patent application Ser. No. 09/262,341 to Katzman et al. requires less differentiability along the lines joining the patches than that of U.S. Pat. No. 5,886,766 to Kaga et al.

The common practice in the ophthalmic industry is to design and manufacture semi-finished lenses. The lens is manufactured with one surface that is given, for example a spherical or toric surface, and one surface that is designed. The given surface is later processed to meet the specific prescription of the client. Consequently most designs are limited in that they take into account only one surface of the lens, assuming, in general, a given spherical or toric other surface. Furthermore, the capability of improving the lens performance by designing both surfaces is not utilized. Recent technological developments enable better control of the manufacturing of both surfaces of ophthalmic lenses. Indeed, U.S. Pat. No. 5,771,089 to Barth, U.S. Pat. No. 5,784,144 to Kelch and U.S. patent application Ser. No. 09/262,341 to Katzman et al. propose designs in which both the front and back surfaces of the lens have flexible shapes. Further technological developments enable manufacturing of multi-surface ophthalmic lenses. U.S. patent application Ser. No. 09/262,341 to Katzman et al. proposes designs in which several of the surfaces have flexible shapes.

In the design of multifocal ophthalmic lens, one usually selects the front (far from eye) surface to be progressive, while the back (close to eye) surface is either spherical or toric, where a toric surface might be needed to correct astigmatism. U.S. Pat. No. 2,878,721 to Kanolt and U.S. Pat. No. 6,019,470 to Mukaiyama et al. disclose ophthalmic lenses in which the back surface is a composition of a progressive surface and a toric surface. This composite design has a drawback that each of the two surfaces (toric and progressive) is designed separately, and thus the optical behavior of one of the surfaces may conflict with the optical behavior of the other. It is therefore beneficial to develop a method for designing a lens consisting of integral surfaces rather than composite surfaces. Such a method could then simultaneously consider all desired optical behavior.

The actual performance of an ophthalmic lens depends not just on the lens itself, but on the full eye-plus-lens system. This becomes particularly important, for example, when the lens user suffers from astigmatism and/or presbyopia. Astigmatism is a condition in which the eye focuses differently in different directions. Presbyopia is a condition in which the eye loses some of its ability to accommodate, i.e. to focus sharply at nearby objects. The curvature of the lens of the eye changes as the eye focuses on objects at different distances from the eye. As people age, their eyes become less elastic and therefore can change the curvature of the lens only to a certain degree.

The article by J. Loos, Ph. Slusallek and H.-P. Seidel, entitled "Using Wavefront Tracing for the Visualization and Optimization of Progressive Lenses", *Computer Graphics Forum*, vol. 17, no. 3, 1998, pp. 255–264, discusses the possibility of accounting for the eye structure in the design process of progressive lenses. However, Loos et al. do not require a full analysis of astigmatism and presbyopia since they assume a spherical or toroidal back surface and optimize only the front surface of the progressive lens.

An important characteristic of a lens is its prism. Prism measures the change in the direction of light rays as they are refracted by the lens. Essentially every lens has some level of prism. Sometimes a lens is processed in order to induce some desired prism for a variety of purposes. However, design methods taking prism into account are not known.

SUMMARY OF THE INVENTION

There is provided in accordance with an embodiment of the present invention a method for designing at least one surface of an optical element. For each particular surface, a representation is created with a set of discrete points. Then for each discrete point in the set, nearest neighbor points from the set are selected, the particular surface is approximated in a vicinity of the discrete point by a polynomial of a predetermined order in two variables of the particular surface, and the coefficients of the polynomial are determined according to the selected nearest neighbor points without requiring continuity between polynomials for neighboring discrete points.

There is also provided in accordance with an embodiment of the present invention a method for designing at least one surface of an optical element. The method includes the steps of representing the at least one surface using the method of unconstrained patches, choosing a function in parameters of the at least one surface, and optimizing the function with respect to the parameters.

There is also provided in accordance with an embodiment of the present invention a method for designing at least one surface of an ophthalmic lens. The method includes the steps of representing the at least one surface with parameters, choosing a function in the parameters, and optimizing the function with respect to the parameters.

Preferably, the ophthalmic lens is a multifocal progressive lens.

Preferably, the function includes a term involving the difference between the astigmatism induced by the ophthalmic lens and a predetermined astigmatism distribution. The predetermined astigmatism distribution describes different astigmatism than that required by a prescription for the ophthalmic lens.

Preferably, the function includes a term involving a power other than 2 of the astigmatism induced by the ophthalmic lens.

Preferably, the function includes a term involving the difference between the prism induced by the ophthalmic lens and a predetermined prism distribution.

Preferably, the function includes a term involving the difference between the gradient of a characteristic and the gradient of a predetermined characteristic distribution, where the characteristic is selected from a group including: power, astigmatism, and prism.

Preferably, the function includes the square of the difference between the power induced by the ophthalmic lens and a predetermined power distribution and other terms related to the power induced by the ophthalmic lens. The other terms related to the power induced by the ophthalmic lens include terms of the form $|P(l,m)-P_v(l,m)|^\beta$ for at least one value of $\beta$ other than 2, where $P(l,m)$ denotes the power induced by the optical element, $P_v(l,m)$ denotes the predetermined power distribution, and $(l,m)$ parameterize the surfaces of the ophthalmic lens.

Preferably, the function includes a term related to the thickness of the ophthalmic lens.

There is also provided in accordance with an embodiment of the present invention a method for designing at least one surface of a multifocal optical element. The method includes the step of concurrently considering in a design of the at least one surface both toric and progressive portions of a prescription for the multifocal optical element.

There is also provided in accordance with an embodiment of the present invention a method for designing a surface of an optical element. The method includes the steps of prescribing initial wavefronts, selecting an initial representation of the surface, the representation including parameters, and precomputing eikonal functions between points in the vicinity of the initial representation and points in the vicinity of the initial wavefronts. When optimizing a cost function dependent upon the parameters, a refracted wavefront for each of the initial wavefronts is calculated from the precomputed eikonal functions.

Moreover, the step of optimizing includes the step of analytically computing derivatives of the cost function using the precomputed eikonal functions.

Furthermore, if during the step of optimizing, a current representation of the surface varies too much from the initial representation, then eikonal functions between points in the vicinity of the current representation and points in the vicinity of the initial wavefronts are computed.

There is provided in accordance with an embodiment of the present invention a method for designing a surface of an optical element. The method includes the steps of prescribing initial wavefronts, selecting an initial parameterized representation of the surface, choosing a function in the parameters, and optimizing the function with respect to the parameters. The step of optimizing includes the steps of calculating a refracted wavefront for each of the initial wavefronts and analytically computing derivatives of the function.

There is provided in accordance with an embodiment of the present invention a method for designing at least one surface of an ophthalmic lens. The method includes the steps of representing the at least one surface by parameters, choosing an astigmatism distribution and an astigmatism direction distribution, choosing a function in the parameters and optimizing the function with respect to the parameters. The function includes a term involving the astigmatism distribution, the astigmatism direction distribution and the astigmatism induced by the ophthalmic lens.

Preferably, the ophthalmic lens is a multifocal progressive lens.

Preferably, the astigmatism distribution and the astigmatism direction distribution are determined from an eyeglass prescription.

Preferably, the term is of the form $$\sum_{l,m} w_1(l,m) \left| \sqrt{(\alpha_{11}(l,m) - \alpha_{22}(l,m))^2 - C_{V,1}^2(l,m) + w_2(l,m)\alpha_{12}^2(l,m)} - C_{V,2}(l,m) \right|^\beta$$

where $(l,m)$ index the parameters for the at least one surface, $C_{V,1}$ is the astigmatism distribution, $C_{V,2}$ is a second astigmatism distribution, $\alpha_{11}$, $\alpha_{12}$ and $\alpha_{22}$ are the coefficients in a quadratic expansion of a wavefront refracted by the lens in a coordinate system chosen for each $(l,m)$ in accordance with the astigmatism direction distribution, $w_1$ and $w_2$ are weight distributions and $\beta$ is an exponent.

BRIEF DESCRIPTION OF THE DRAWINGS AND APPENDIX

The present invention will be understood and appreciated more fully from the following detailed description taken in conjunction with the appended drawings in which.

DETAILED DESCRIPTION OF THE PRESENT INVENTION

Figure 1:
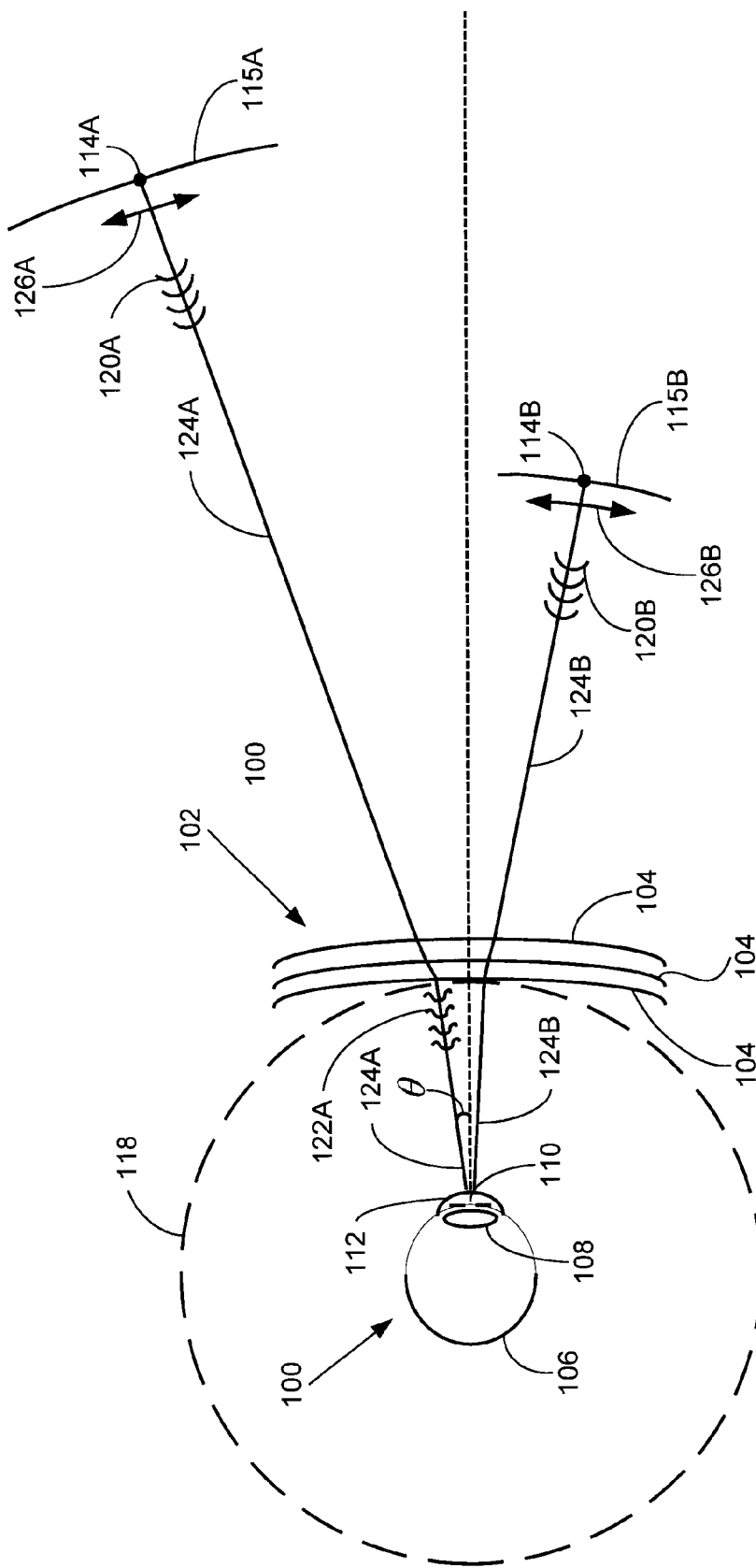
FIG. 1 is a schematic illustration of an eye, and a lens having at least two surfaces, helpful in understanding the present invention.

The present invention is directed to a method for designing optical elements using wavefront calculations. An optical element is designed so that it converts a set of prescribed initial wavefronts into a set of associated wavefronts with desired properties. In general, it is not possible to solve the problem exactly, so an optimization method is used to produce the best optical element subject to the design constraints. The resulting designed surfaces of the optical element are integral surfaces and not composite surfaces.

The present invention provides a method that enables design of a multi-surface optical element, in which any or all of the surfaces are designed, possibly simultaneously, using the method of the present invention.

The present invention is directed to efficient optimization methods that provide the designer of the optical element with a large number of degrees of freedom to ensure a superior optical element. The degrees of freedom are the set of variables that define any of the surfaces of the optical element that need to be designed. It may be that some of the surfaces are fixed and cannot be changed. In that case, only the variables determining the non-fixed surfaces are considered to be degrees of freedom. In order to provide the designer with a large number of degrees of freedom, it is necessary to represent the surfaces efficiently and accurately. Applicants have found that it is advantageous to use several different surface representations. As will be described hereinbelow, some representations are useful for calculating wavefronts, while another representation is useful in an optimization process.

In ideal situations, the surfaces are given explicitly in terms of well-known functions. Examples of such surfaces include spherical surfaces, aspherics, etc. In general, though, the designer should be allowed to design arbitrary surfaces, and therefore, in the present invention, discrete surfaces are used. Discrete surfaces are described in terms of finitely many points, for example, in the form of a set $Q=\{p_i=(x_i, y_i, z_i)\}$, $i=1, \ldots, N$, where N is the total number of points.

There are several efficient ways to describe discrete surfaces. Spline methods have the drawbacks mentioned in the background. U.S. patent application Ser. No. 09/262,341 to Katzman et al. describes a finite element method for describing discrete surfaces.

Applicants have discovered that a surface representation, termed "unconstrained patches", is highly efficient for the purpose of optical design. An arbitrary surface is described in terms of N discrete points, for example, in the form of the set Q mentioned hereinabove. In the vicinity of each discrete point $p_i=(x_i,y_i,z_i)$ ("a patch"), the surface is approximated by a local function $z=f_i(x, y)$, where $f_i$ is a polynomial of a predetermined order in the variables x and y. The unknown polynomial coefficients are chosen to best fit the discrete values of the nearest neighbors to $p_i$ in the set Q. The number of neighbors for the fit is preferably taken to be larger than the number of unknown coefficients of $f_i$ to ensure accuracy and stability. This problem of determining the coefficients can be handled by techniques known in the art, such as the least squares method.

Therefore, each point $p_i$ in the set Q is associated with a list of the coefficients of $f_i$. It is noted that each patch is constructed separately and continuity of any kind between patches is not required. This method of "unconstrained patches" has several advantages. Firstly, the discrete set Q is arbitrary, and not constrained as in the finite elements method, or, even worse, as in the bicubic spline method. Secondly, the degrees of the polynomials $f_i$ are chosen by the designer, adding to the flexibility of the method.

The present invention is particularly suitable for the design of ophthalmic spectacle lenses, including progressive addition lenses. Therefore, the detailed description that follows describes such an application, in which the initial wavefronts are refracted by the surfaces of the lens. However, it will be appreciated by persons skilled in the art that the present invention is equally applicable to the design of other optical elements including contact lenses and intraocular lenses and to the design of corneal shaping.

Reference is now made to FIG. 1, which is a schematic illustration of an eye 100 and a lens 102 having at least two surfaces 104, according to an embodiment of the present invention. Eye 100 comprises a retina 106, an eye-lens 108, a pupil 110 and a cornea 112. At least one of surfaces 104 of lens 102 is unknown and will be optimally designed by the method of the present invention.

An initial surface is chosen for each of the unknown surfaces 104 of lens 102. Consider a ray 124A drawn from a central point in the eye towards lens 102 at a spatial viewing angle of θ. The lens designer specifies, for each viewing angle θ, the distance that the wearer of the lens should be able to see in focus. In progressive lenses, for example, viewing angles above the horizon (shown in FIG. 1 as a horizontal dotted line) are generally reserved for far vision, while viewing angles below the horizon are generally reserved for near vision.

When ray 124A reaches lens 102, it is refracted by surfaces 104, whether they are known surfaces or initial guesses for the unknown surfaces. Therefore, the direction of ray 124A on the side of lens 102 away from the eye is generally different than the direction of ray 124A on the side of lens 102 near the eye. Ray 124A is drawn until it reaches a sphere 115A centered at the central point in the eye and whose radius is the prescribed distance for the viewing angle θ. Ray 124A intersects sphere 115A at point 114A.

If point object 114A were to emit, say, spherical wavefronts 120A, then they would be refracted by lens 102 into distorted wavefronts 122A. Since lens 102 comprises initial guesses for the unknown surfaces, distorted wavefronts 122A are probably inconsistent with the wearer's prescription. In other words, the initial guesses for the unknown surfaces are probably incorrect. An optimization process is used to determine the optimal surfaces 104 of lens 102, based on a cost function. During the optimization process, the unknown surfaces of lens 102 are varied from the initial surfaces, causing the direction of ray 124A on the side of lens 102 away from the eye to change, as indicated by arrow 126A. As the direction changes, the intersection of ray 124A with sphere 115A, namely point object 114A, changes. It will be appreciated, however, that since, by definition, point object 114A remains on sphere 115A, the lens designer's specification of the distance that the wearer of the lens should be able to see in focus is maintained throughout the optimization process.

The eye has a natural aperture—the eye's pupil 110. As the eye rotates while scanning the viewing field, only a small portion of each of the spherical wavefronts 120A emitted from the point objects actually gets transmitted through the pupil 110. This small portion of each spherical wavefront 120A is converted by lens 102 to a small portion of the corresponding refracted wavefront 122A. These small portions ("localized wavefronts") are centered around ray 124A, which is termed a "chief ray". Each point object 114 is associated with its own chief ray 124 having a viewing angle θ.

Since the shape of refracted wavefront 122A contributes to the image seen by the eye, it characterizes the performance of lens 102 with respect to the point object 114A. Thus the designer wants the refracted wavefronts 122 to have desired properties in order to achieve high quality vision. The article "Testing and centering of lenses by means of a Hartmann test with four holes" by D. Malacara and Z. Malacara, published in *Optical Engineering,* 1992, vol. 31 no. 7, pp. 1551–1555, explains how to read from the refracted wavefront's shape the standard characteristics such as the power of the lens, its prism, its astigmatism, its coma, etc. A standard procedure in the ophthalmic industry is to define the vertex sphere. This is a virtual sphere 118 of a fixed radius known in the industry, for example 27 mm, centered at the center of the eye, having its vertex coinciding with the vertex of the back surface of lens 102. Commonly the wavefronts are propagated beyond the lens to virtual sphere 118, where the optical characteristics are computed.

Figure 2:
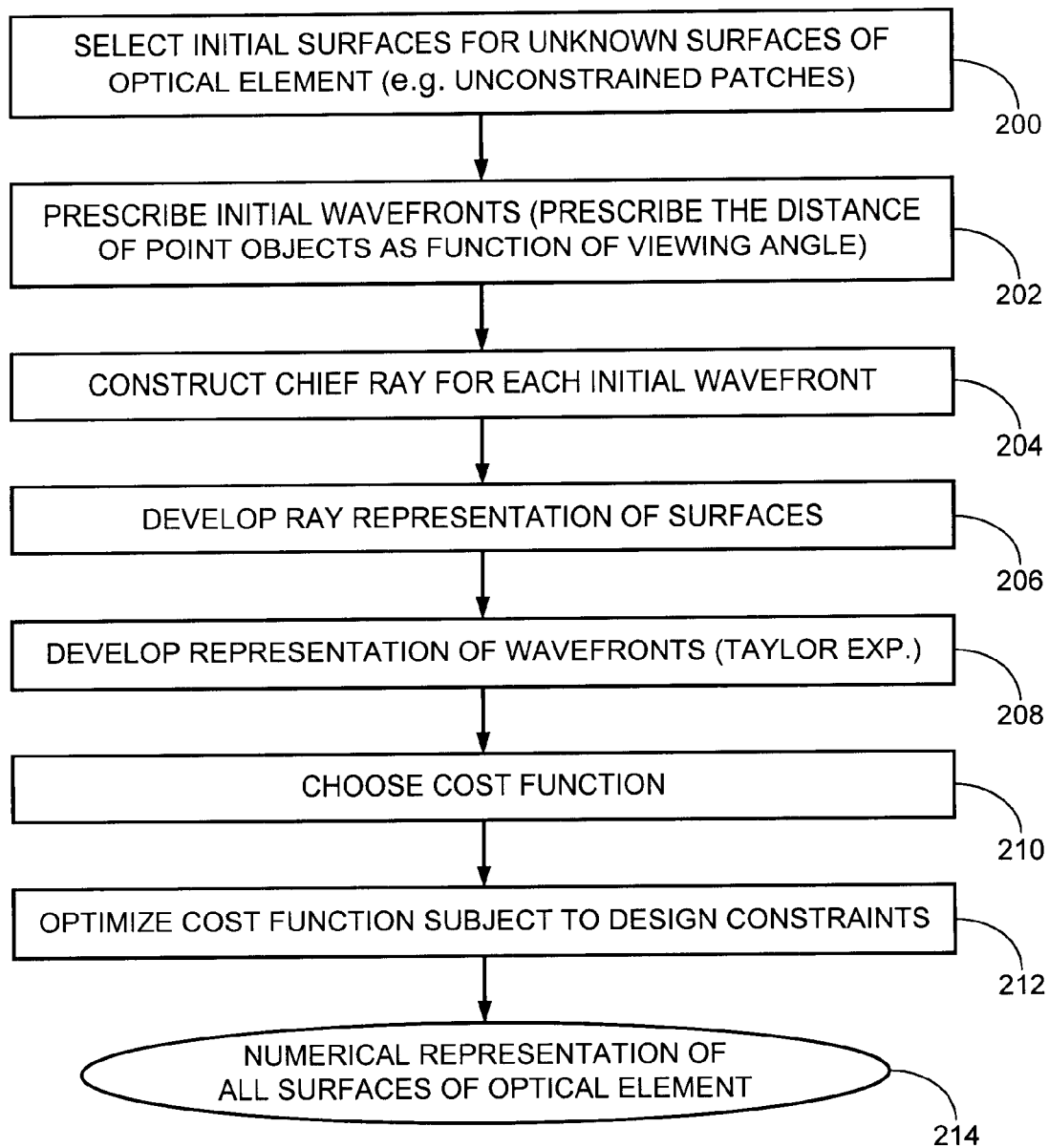
FIG. 2 is a flowchart illustration of a method for designing optical elements using wavefront calculations, according to an embodiment of the present invention.

Reference is also made to FIG. 2, which is a flowchart illustration of a method for designing optical elements using wavefront calculations, according to an embodiment of the present invention.

Initial surfaces are chosen for the unknown surfaces of the optical element (step 200). These initial surfaces are typically represented in one of the representations described hereinabove. Preferably, these initial surfaces are represented with a finite elements method or with the method of unconstrained patches.

The designer of the lens then prescribes initial wavefronts (step 202). These initial wavefronts can be prescribed in any way. For simplicity, many point objects 114 are selected, each emitting a spherical wavefront 120. In an embodiment, the designer specifies as a function of the spatial viewing angle θ the distances of the point objects from a central point in the eye. For example, in the design of a single vision lens, all the point objects are placed at a substantially fixed distance from the central point in the eye.

The spherical wavefront 120 from each point object 114 propagates towards the eye. As it passes through lens 102, it is refracted by each of lens surfaces 104, thus resulting in a refracted wavefront 122.

A chief ray is constructed, as explained hereinabove with respect to FIG. 1, for each of the point objects (step 204) using ray tracing techniques.

The optimization process of the present invention requires repeated calculations of the intersection points of the chief rays with the surfaces of the optical element. When the surfaces are described discretely in a fixed global coordinate system, for example Cartesian coordinates or polar coordinates, as described hereinabove, this calculation is computationally intensive. Therefore, an alternative "ray representation", in which the surfaces are represented by their distance from predetermined fixed points along the chief rays, is preferred. The difference between the previous representation and the ray representation is analogous to the difference between the Eulerian and Lagrangian formulations that are well known in the theory of mechanics.

Figure 3:
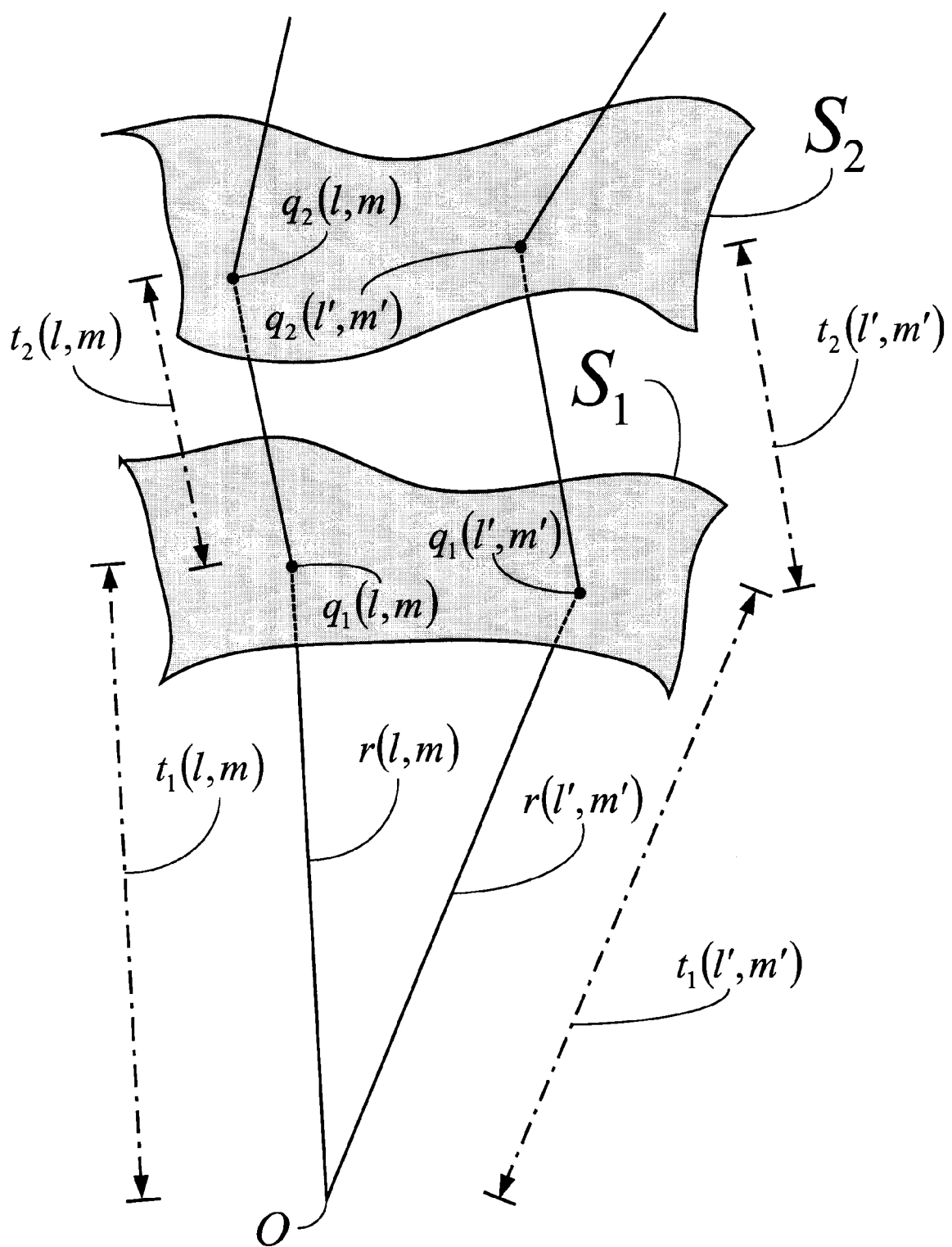
FIG. 3 is a schematic illustration of surfaces of a lens and of chief rays passing therethrough, according to an embodiment of the present invention.

A ray representation of the known and initial surfaces 104 is developed (step 206). Reference is now made briefly to FIG. 3, which is a schematic illustration of surfaces of the lens and of chief rays passing therethrough, according to an embodiment of the present invention. The lens consists of several surfaces $S_1, S_2, \ldots, S_k$. A chief ray can be identified by the viewing angle of the point object that it connects with the eye. The viewing angle is parameterized by discrete indices l and m. A chief ray r(l,m), constructed as described hereinabove consists of several straight line segments whose directions change as the ray is refracted by the lens surfaces. The intersection point of chief ray r(l,m) with the surface $S_j$ is denoted by $q_j(l,m)$. The set $\{q_j(l,m)\}$ provides a discrete representation of the surface $S_j$. This is the "ray representation".

Fixing the directions of the various segments of chief ray r(l,m) (using Snell's law), the intersection points $q_1(l,m)$, $q_2(l,m), \ldots, q_k(l,m)$ of chief ray r(l,m) with the lens surfaces can be represented by the sequence of distances between adjacent intersection points: $t_1(l,m)=|q_1(l,m)|, t_2(l,m)=|q_2(l,m)-q_1(l,m)|, \ldots t_k(l,m)=|q_k(l,m)-q_{k-1}(l,m)|$. The distance $t_1(l,m)=|q_1(l,m)|$ measures the distance along chief ray r(l,m) from starting point O (typically a central point in the eye) to the surface $S_1$. Similarly, the intersection points of a chief ray r(l',m') also starting from O can be represented by the sequence of distances $t_1(l', m')=|q_1(l', m')|, t_2(l',m')=|q_2(l', m')-q_1(l',m')|, \ldots, t_k(l',m')=|q_k(l',m')-q_{k-1}(l',m')|$.

The set of values $\{t_j(l,m)\}$ also provides a discrete representation of the surface $S_j$. The advantage of this Lagrangian description is that it automatically provides the intersection points of the chief rays with the lens surfaces. In the optimization process, the surfaces are modified in an iterative process that eventually converges to an optimal solution. With this Lagrangian description, the surfaces are modified by varying the values $\{t_j(l,m)\}$ along the chief rays. This has several advantages: firstly, there is no need to compute the intersection points with the chief rays, because these intersection points are now built in the surface representation; secondly, the surface is conveniently modified in only one dimension—along the chief ray.

A ray representation can also be used in conjunction with other surface representations, for example in a finite elements method. Consider a system of rays parameterized by two discrete indices (l,m) and a single refractive surface $S_1$. Define a reference surface $S_p$ also parameterized by (l,m) and set the distance between $S_p$ and $S_1$ along any ray to be t(l,m). $S_1$ is fully determined by the fixed reference surface $S_p$ and by the function t. A finite element representation for the function t(l,m) is then constructed, as described in the classical texts of the finite element methods, and in the particular optical context by U.S. patent application Ser. No. 09/262,341 to Katzman et al.

Once the surfaces have been represented by a ray representation, one needs to calculate the distortion of the initial localized wavefronts as they are refracted by the lens. A standard way to compute these distortions is to trace many rays through the lens. This method has the serious disadvantage that it requires the computation of the intersection of many rays with each of the lens surfaces, and the refraction of the rays at the intersection. Such calculations make this approach highly inefficient, since, in the optimization process, many computations of the distortion of localized wavefronts are made.

Since, as mentioned hereinabove, only a small portion of each of the spherical wavefronts 120 emitted from the point objects 114 actually gets transmitted through the pupil 110, only the localized refracted wavefront 122, which is centered around the chief ray 124 leading from the point object 114 to the eye, needs to be calculated. The localized refracted wavefront can be used to compute the various wavefront characteristics by methods that are known in the art.

Figure 4:
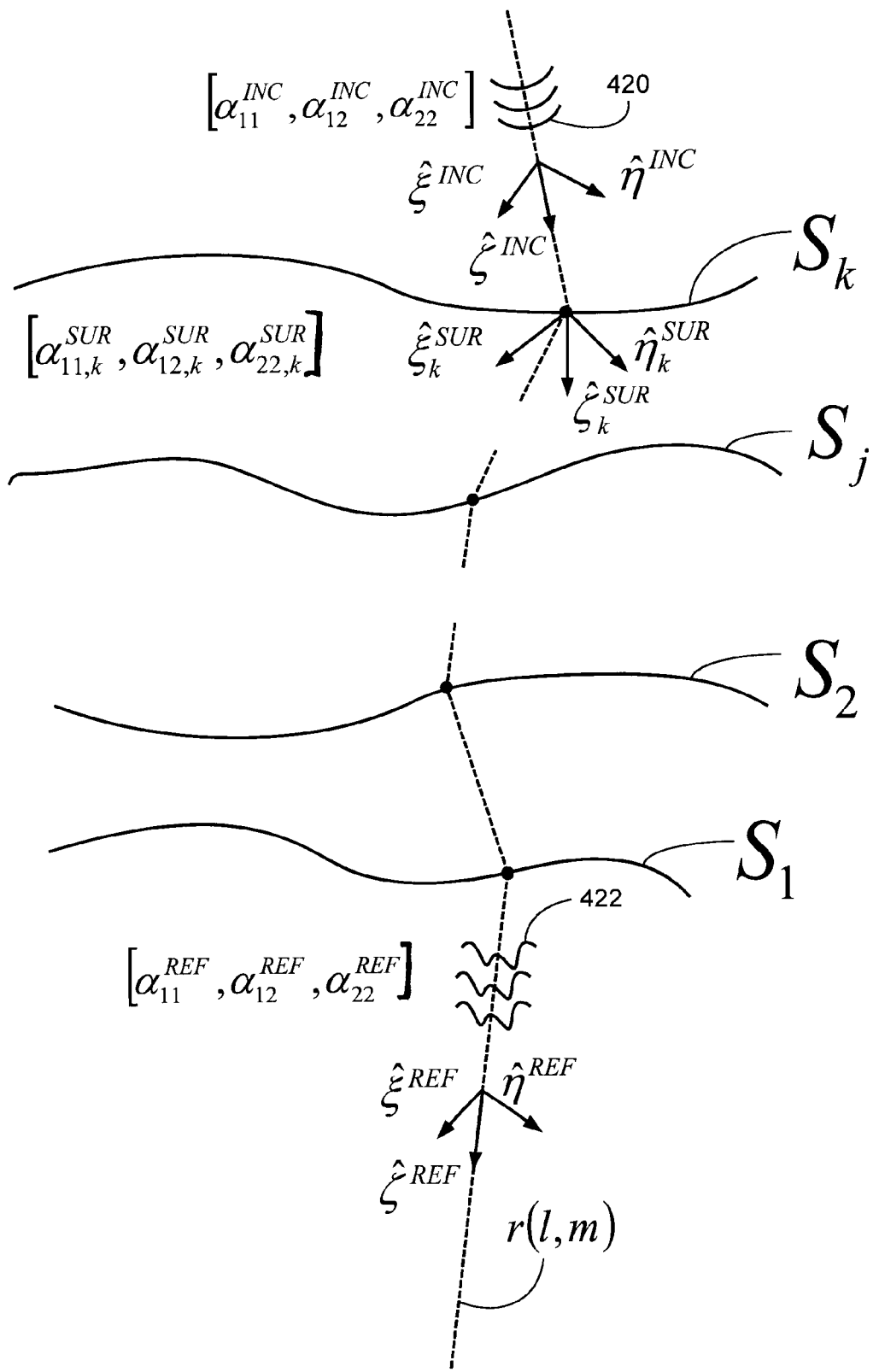
FIG. 4 is a schematic illustration of surfaces of a lens and of chief rays passing therethrough, according to an embodiment of the present invention, helpful in understanding the representation of localized wavefronts.

The localized wavefronts are represented (step 208 of FIG. 2) using Taylor expansions. Reference is now made briefly to FIG. 4, which is a schematic illustration of surfaces $S_j$ of the lens and of chief rays r(l,m) passing therethrough, according to an embodiment of the present invention. A localized spherical wavefront 420 is refracted by the lens surfaces into a localized refracted wavefront 422 beyond the lens. It is necessary to calculate the localized refracted wavefronts.

According to an embodiment of the present invention, the calculation is based on a direct computation of the first few terms of the Taylor expansion of the localized wavefront as it is refracted by an optical surface. For this purpose, "front-associated" coordinate systems are defined. These are local coordinate systems having a $\hat{\zeta}$ axis pointing in the direction of the chief ray and variables $\xi$ and $\eta$ in the orthogonal plane. Since the wavefront is orthogonal to the chief ray, there are no linear terms in the Taylor expansion for the wavefront's local representation in these front-associated coordinates. Thus the leading order terms in the Taylor expansion for the wavefront are given by Equation 1:

$$\zeta = \alpha_{11}\xi^2 + \alpha_{12}\xi\eta + \alpha_{22}\eta^2 + \ldots \quad \text{(Eq. 1)}$$

where $\alpha_{11}$, $\alpha_{12}$ and $\alpha_{22}$ are Taylor coefficients.

According to an embodiment of the present invention, only quadratic terms in the local Taylor expansion are considered. This effectively acts to restrict the wavefront to the portion that is transmitted through the pupil. These quadratic terms are related to the principal curvatures of the wavefront and their directions. The relations between the Taylor coefficients and the power and astigmatism of the wavefront are given by Equation 2:

$$\text{Power} = \alpha_{11} + \alpha_{22}$$

$$\text{Astigmatism} = 4\sqrt{[\alpha_{11} - \alpha_{22}]^2 + \alpha_{12}^2} \quad \text{(Eq. 2)}$$

The variables $\xi$ and $\eta$ are defined above with respect to an arbitrary orthogonal coordinate system perpendicular to the chief ray. In some applications, as will be described in more detail hereinbelow, it is preferred to choose a specific coordinate system in the plane perpendicular to the chief ray. For example, Applicants have discovered that it might be preferable to rotate the $(\hat{\xi},\hat{\eta})$ coordinate system so that the new axes will be along the directions of the principal curvatures of the wavefront. It will be appreciated that in this rotated coordinate system, the Taylor coefficient $\alpha_{12}$, which contributes to the astigmatism as per Equation 2, has a value of zero.

Therefore, the triplets $\{[\alpha_{11}(l,m), \alpha_{12}(l,m), \alpha_{22}(l,m)]\}$ represent the wavefront. The front-associated coordinate system $(\hat{\xi}^{INC}, \hat{\eta}^{INC}, \hat{\zeta}^{INC})$ thus leads to a representation $$[\alpha_{11}^{INC}, \alpha_{12}^{INC}, \alpha_{22}^{INC}]$$

for the localized incoming wavefront, and the front-associated coordinate system $(\hat{\xi}^{REF}, \hat{\eta}^{REF}, \hat{\zeta}^{REF})$ leads to a representation $$[\alpha_{11}^{REF}, \alpha_{12}^{REF}, \alpha_{22}^{REF}]$$

for the localized refracted wavefront. It is these Taylor coefficients for the localized refracted wavefronts for each chief ray r(l,m) that need to be calculated.

Since the localized wavefronts are of finite extent, it is expected that they will overlap somewhat. A given area on the lens may focus wavefronts from one point object differently than it focuses wavefronts from another point object. Therefore it may happen that some lens shapes are advantageous for viewing some objects but not for viewing other objects. The optimization process compromises between the requirements of good lens performance for all the point objects. In order to compute a lens providing high quality vision, the designer determines a cost function to be optimized (step 210 of FIG. 2).

In an embodiment of the present invention, the cost function G is written in the form given in Equation 3:

$$G = \sum_{l,m \in D} \sum_{i=1}^{M} U_i(l, m, S, w_i) \quad \text{(Eq. 3)}$$

where (l,m) are the parameters used to describe the lens surfaces, D is the domain in which l and m are defined, $w_i$ are the weight functions used by the designer to emphasize different factors in the cost functions, S stands for the collection of lens surfaces $S_1, S_2, \ldots, S_k$, and the sum is over the M various factors $U_i$. The weight functions $w_i$ can depend on the parameters l and m and on the surfaces S and their gradients. In an embodiment, some of the factors $U_i$ are chosen to be linear functions of the weights, in the form:

$$U_i(l,m,S,w) = w_i(l,m,S) T_i(l,m,S),$$

where $T_i$ are the factors in the cost function.

The designer selects the factors $U_i$ and/or $T_i$ for optimization. In an embodiment, the factors $U_i$ and/or $T_i$ are any combination of the following terms:

Required Power. For this purpose, the designer predetermines a function $P_v(l,m)$ that prescribes the desired power of the lens at the point (l,m). Then the designer sets a term that is related to the deviation of the actual power P(l,m) from the desired power $P_v(l,m)$. In the prior art, the only power related term appearing in a cost function is $|P(l,m)-P_v(l,m)|^2$. Applicants have discovered that other power-related terms can improve the design of a lens. In particular, in the cost function, the power term could be a weighted combination of terms of the form $|P(l,m)-P_v(l,m)|^\beta$, for several choices of $\beta$.

Required Astigmatism. Every progressive lens has some level of astigmatism C(l,m). In many applications, the designer attempts to minimize this astigmatism. For example, this is a design goal when designing semi-finished lenses or when designing a customized lens according to the specific prescription of a client where the prescription has no level of astigmatism. Such situations are termed "astigmatic-free" designs. In other applications, the designer wants to achieve a lens with a predetermined astigmatism distribution. For example, this is a design goal when designing a customized lens according to the specific prescription of a client where the prescription has some level of astigmatism. Such situations are termed "astigmatic" designs. It is appreciated that the astigmatism in astigmatic designs includes information on the required directions of astigmatism.

Astigmatic-free designs can be accomplished, for example, by using a term of the form $C(l,m)^2$. Unfortunately, progressive lenses designed by minimizing the lens astigmatism in some parts of the lens often suffer from high disturbing astigmatism in other parts of the lens. Applicants have discovered that a lens design can be improved by other choices. In particular the form $|C(l,m)|^\beta$, for different choices of $\beta$, is useful. One motivation for choosing a $\beta$ other than 2, is that choosing, say, $\beta=1$ gives extra weight to areas in the lens where the astigmatism is lower. In an embodiment, a weighted combination of terms of the form $|C(l,m)|^\beta$ for several choices of $\beta$ is used in the cost function.

In another preferred embodiment, a weighted combination of terms of the form $|C(l,m)-C_v(l,m)|^\beta$ for several choices of $\beta$ is used, where $C_v(l,m)$ is an astigmatism distribution different from the client's prescription. In particular, even when the prescription has no astigmatism, a non-zero choice for $C_v(l,m)$ is recommended. It might seem odd initially to deliberately choose a non-zero $C_v(l,m)$, but Applicants have realized that by allowing low astigmatism at some parts of the lens, the designer has a better chance of reducing the high, disturbing astigmatism at other parts of the lens. Furthermore, it is well known that the eye can adjust to low levels of astigmatism.

Terms $U_i$ in the cost functions that relate to astigmatic designs will now be explained. The goal of an astigmatic design is to achieve predetermined distributions of astigmatism $C_v(l,m)$, and astigmatism directions $\hat{\rho}(l,m)$. Astigmatic designs are particularly useful in designing customized ophthalmic lenses according to a client's prescription. The prescription includes the prescribed power of the lens, the prescribed astigmatism and the direction of the prescribed astigmatism. In an embodiment, the prescribed astigmatism direction is used to select the distribution $\hat{\rho}(l,m)$ of astigmatism directions in the plane perpendicular to the chief rays. The required astigmatism values $C_v(l,m)$ are also selected according to the prescribed astigmatism. In an embodiment, the designer may select $C_v(l,m)$ and $\hat{\rho}(l,m)$ for each point $(l,m)$ according to the prescribed astigmatism and prescribed direction regardless of the viewing angle. In another preferred embodiment, the distributions $C_v(l,m)$ and $\hat{\rho}(l,m)$ are determined from the prescribed astigmatism and the viewing angle by some rule. For example, a variation of Listing's law as described in the article by J. Porill, J. P. Ivins and J. P. Frisby, "The variation of torsion with vergence and elevation", Vision Research, volume 39, pp. 3934–3950 (1999) can be used for this purpose.

In an embodiment, the astigmatism direction distribution is used to fix the $(\hat{\xi},\hat{\eta})$ coordinate system in the orthogonal plane for each chief ray. Using this choice, the Taylor coefficient $\alpha_{12}$ in Equation 1 ought to have a value of zero, and therefore the astigmatism of the wavefront would be given by the difference between the Taylor coefficients $\alpha_{11}$ and $\alpha_{22}$.

In another preferred embodiment, combinations of terms of the form $$\sum_{l,m} w_1(l,m) \left| \sqrt{(\alpha_{11}(l,m) - \alpha_{22}(l,m) - C_{V,1}(l,m))^2 + w_2 \alpha_{12}^2(l,m)} - C_{V,2}(l,m) \right|^\beta$$

for various choices of $\beta$ are used in the cost function, where $w_1(l,m)$ and $w_2(l,m)$ are weights, the distribution $C_{v,1}(l,m)$ is the desired astigmatism distribution according to the client's prescription and the distribution $C_{v,2}(l,m)$ is selected by the designer to allow low levels of non-prescription astigmatism in various regions of the lens. Terms of this form have the advantage that during the optimization process, the designer can control both the required astigmatism direction (by minimizing the undesired coefficient $\alpha_{12}$) and the astigmatism value (through the distributions $C_{v,1}(l,m)$ and $C_{v,2}(l,m)$).

Cosmetic considerations. One of the criteria in the ophthalmic industry for the quality of a lens is its overall appearance, and in particular its thickness. Since the optimization methods of the present invention take the full structure of the lens into account, together with its constituent surfaces, Applicants have discovered that it can be useful to add to the cost function a term that is proportional to the lens thickness at the point $(l,m)$.

Required prism. The local behavior of each wavefront determines the local prism of the lens. In fact, the prism is already determined by the deflection of the chief ray. Applicants have realized that it is useful to predetermine a function $Prism_v(l,m)$ prescribing the desired prism for the lens at the point $(l,m)$. In an embodiment, a weighted combination of terms of the form $|Prism(l,m)-Prism_v(l,m)|^\beta$ for several choices of $\beta$ is used in the cost function.

Variations in the lens characteristics. Applicants have realized that the lens performance can be improved by preventing too rapid variations in the lens characteristics. Alternatively, the designer may wish to obtain a prescribed distribution of the variations. For every lens characteristic, denoted by CH, the designer adds a weighted combination of terms of the form $|\nabla CH(l,m) - \nabla CH_v(l,m)|^\beta$, where $\nabla$ is the gradient operator, and $\nabla CH_v(l,m)$ is the desired gradient distribution of CH. In an embodiment, controlling the variations in the power, astigmatism and prism improves the lens quality.

The design method based on the cost function G can be used to design surfaces that are progressive, astigmatic and prismatic. Moreover, any combination of the progression of the optical power, the astigmatism of the lens, and the prism of the lens are designed simultaneously and concurrently, thus leading to integral surfaces. It will be appreciated that the design of integral surfaces is superior to the prior art, as described in U.S. Pat. No. 2,878,721 to Kanolt and U.S. Pat. No. 6,019,470 to Mukaiyama et al., where two separate surfaces are designed, one for the optical power progression, and one for the required astigmatism, and then composed to obtain a composite surface. Consequently, in a lens with a composite surface, one or more of the constituents of the composite surface may damage some of the optimal properties of the other constituents. While in the design of a composite surface there is no correlation between the two parts (progressive and toric), the design of an integral surface takes both of them into account simultaneously, thus ensuring an overall optimization. In another example, the thickness of a toric contact lens is increased in certain regions of the lens so that when worn, it will stay on the eye in a particular orientation. The prism of the contact lens needs to be adjusted in those regions in order to compensate for the added thickness. Thus, it is beneficial to design one or more integral surfaces using a design method that takes the astigmatism and the prism into account simultaneously and concurrently. In a further example, there are design requirements for lenses having progressive power, astigmatism and prism. The design method described herein enables the design of an integral surface while concurrently taking into account all of these requirements.

Once the cost function has been chosen, it needs to be optimized (step 212 of FIG. 2). The optimization process consists of searching for those surfaces that yield the best value for the cost function. The cost function is optimized subject to the requirement that the surfaces never intersect and possibly subject to additional constraints given in the form of prescribed values for the surfaces and/or their derivatives at a selected set of points. The result of the optimization process is a numerical representation of all designed surfaces of the optical element (step 214). It will be appreciated that these designed surfaces are integral surfaces and not composite surfaces.

Figure 5:
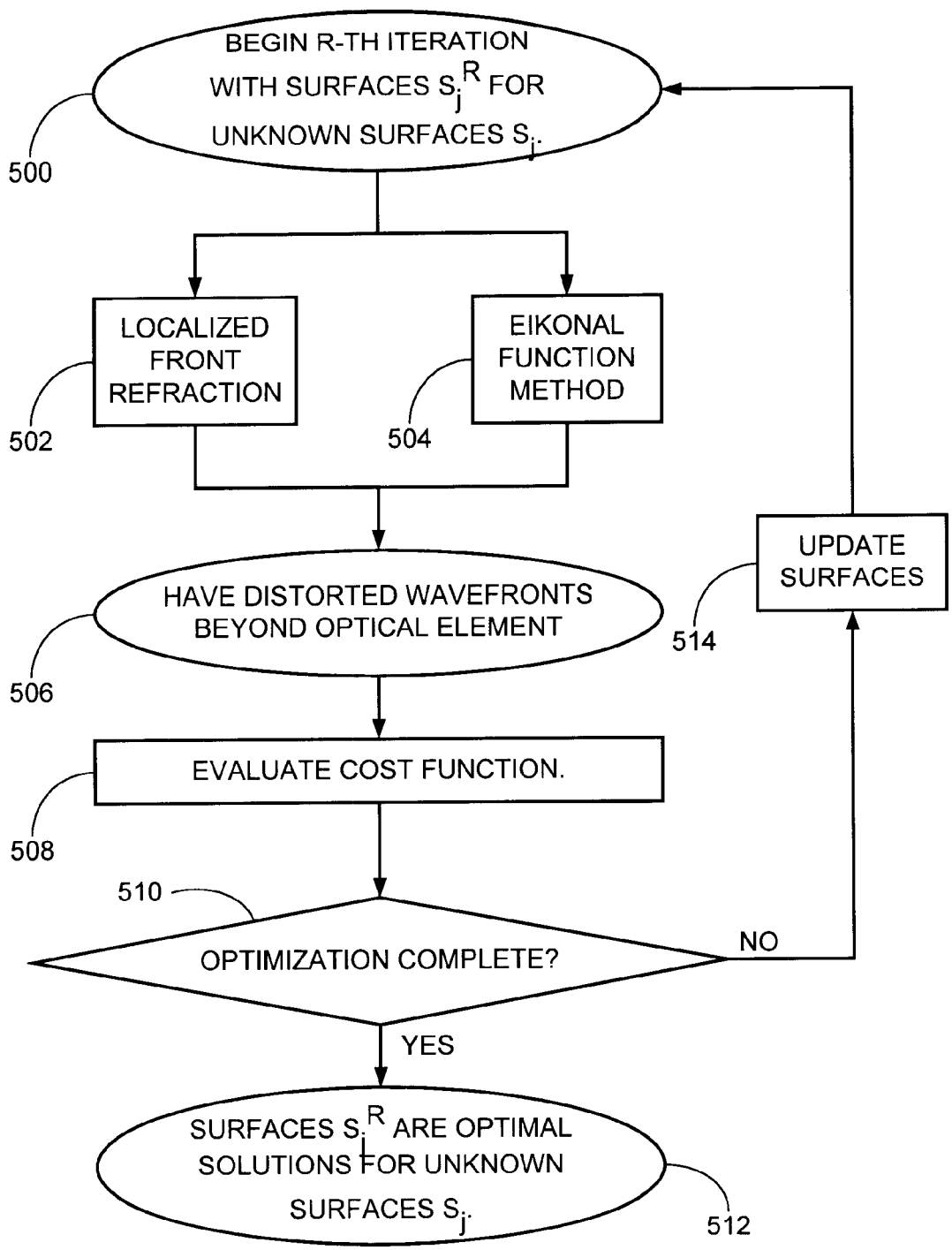
FIG. 5 is a flowchart illustration of the optimization step of FIG. 2, according to an embodiment of the present invention.

Many optimization methods are known in the art. For example, common techniques include the conjugate gradient method and the Newton method. Essentially all methods are iterative. Reference is now made to FIG. 5, which is a flowchart illustration of the optimization step 212 of FIG. 2, according to an embodiment of the present invention.

When the Rth step in the iteration begins, each unknown surface $S_j$ has the shape $S_j^R$ (step 500). Localized spherical wavefronts emitted by point objects are refracted by the surfaces of the lens into localized refracted wavefronts beyond the lens. It is necessary to calculate the localized refracted wavefronts.

In an embodiment, the Taylor coefficients for the localized refracted wavefronts beyond the optical element are calculated using a localized front refraction method (step 502). Referring back to FIG. 4, in this method, another local coordinate system $$(\hat{\xi}_k^{SUR}, \hat{\eta}_k^{SUR}, \hat{\zeta}_k^{SUR})$$

is constructed at the intersection point of the chief ray with the surface $S_k$ (farthest from the eye), so that its $\hat{\zeta}$ axis points in the direction of the normal of the surface. The surface $S_k$ is locally represented by its Taylor expansion in this coordinate system $$[a_{11,k}^{SUR}, a_{12,k}^{SUR}, a_{22,k}^{SUR}].$$

By differentiating Snell's law, the Taylor coefficients of the localized wavefront after refraction by the surface $S_k$ can be expressed in terms of the Taylor coefficients of the incoming localized wavefront and the Taylor coefficients of the surface at the intersection point. This localized front refraction method is repeated for each surface until the Taylor coefficients of the localized refracted wavefront beyond the optical element have been calculated.

A formulation of the localized front refraction method is given in J. Kneisly, "Local curvature of wavefronts in an optical system", JOSA 54, 1964, pp. 229–235. A formula is developed that directly connects the principal curvatures and directions of a refracted wavefront with the principal curvatures and directions of the wavefront before refraction and the principal curvatures and directions of the surface at the point of refraction.

Applicants have discovered a novel method, based on eikonal functions, for calculating the localized refracted wavefronts beyond the optical element. Eikonal functions are well known classical objects in optics. O.N. Stavroudis, *The Optics of Rays, Wavefronts and Caustics,* Academic Press, 1972, pp. 200–207 is a general reference on the history of eikonals and their applications in optics. The novel eikonal method involves precomputing eikonal functions and geometrical quantities related to the known and initial surfaces. It provides an efficient explicit computation of the localized refracted wavefronts, and provides an explicit computation of the coefficients $$[a_{11}^{REF}, a_{12}^{REF}, a_{22}^{REF}]$$

in terms of the free parameters. The eikonal method (step 504) is describe in detail hereinbelow.

The calculation of the shape of the localized wavefront after refraction by all surfaces of the optical element, using the eikonal method or the localized front refraction method or some other suitable method, results in localized refracted wavefronts beyond the optical element (step 506).

Once the localized refracted wavefronts have been calculated, the cost function can be evaluated (step 508) and checked (step 510). If the cost function is sufficiently optimized according to some predetermined criteria, then the surfaces $S_j^R$ are optimal solutions for the unknown surfaces $S_j$ (step 512). If, however, the cost function is not sufficiently optimized, then the surfaces $S_j^R$ are updated for the next iteration (step 514) and the method continues the next step in the iteration (step 500).

Each iteration step requires the calculation of the derivative of the cost function with respect to all its variables. In fact, popular optimization methods, such as the Newton method, require also the computation of the second derivatives. Since a flexible design includes a very large number of free variables, and since the computation of derivatives is required for each iteration, it is desirable to look for efficient methods of computing these derivatives.

One possibility is to compute the derivatives numerically. For this purpose, one slightly varies a certain parameter and evaluates the resulting change in the cost function. Since the lens surfaces and the refraction of the wavefronts by them are characterized by local properties, there is no need to recompute the transfer of all of the wavefronts for each such small local variation. This localization accelerates the computation of the derivatives, and hence the entire optimization process.

Figure 6:
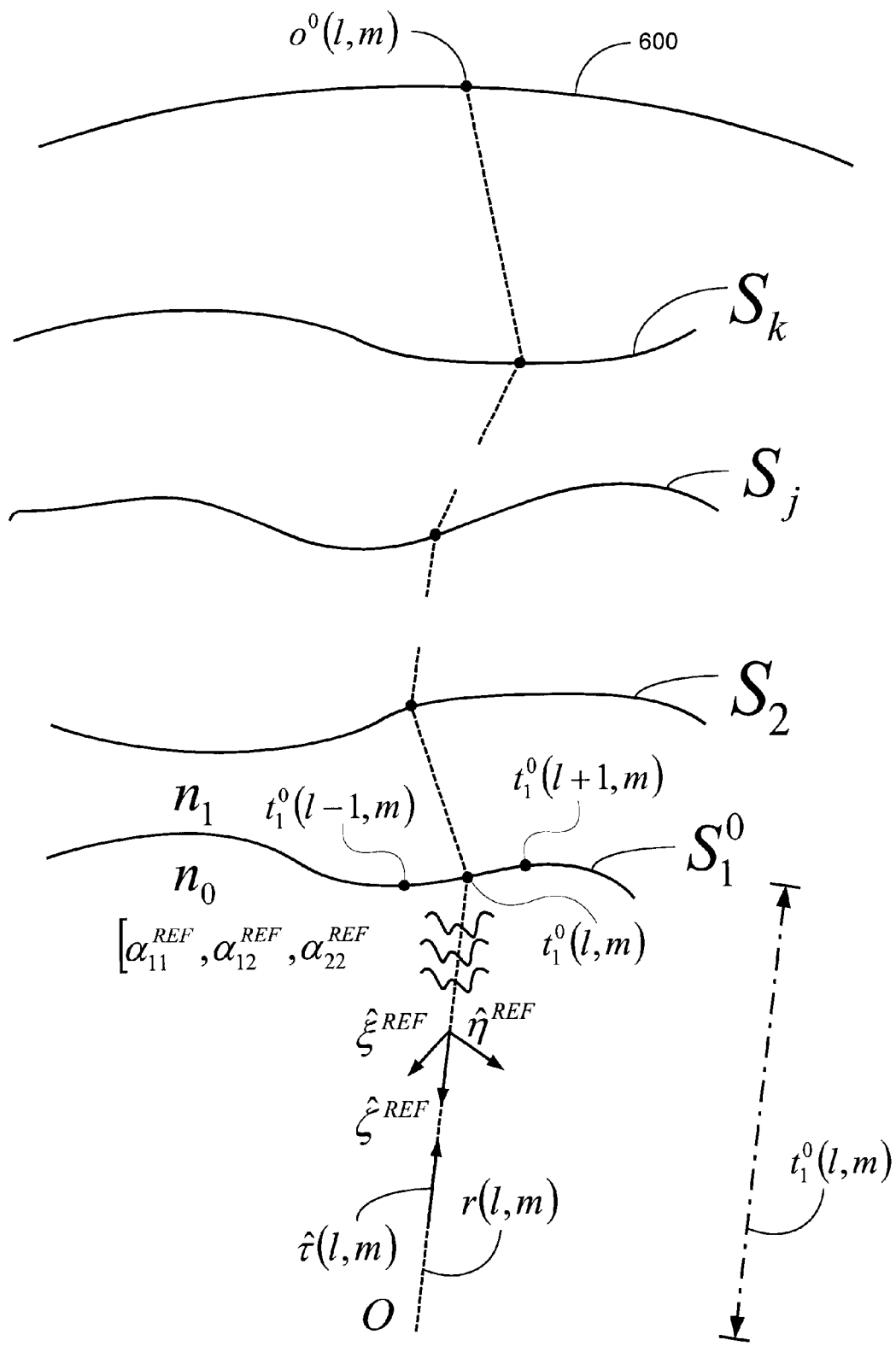
FIG. 6 is a schematic illustration of a chief ray and surfaces of an optical element, according to an embodiment of the present invention.
Figure 7:
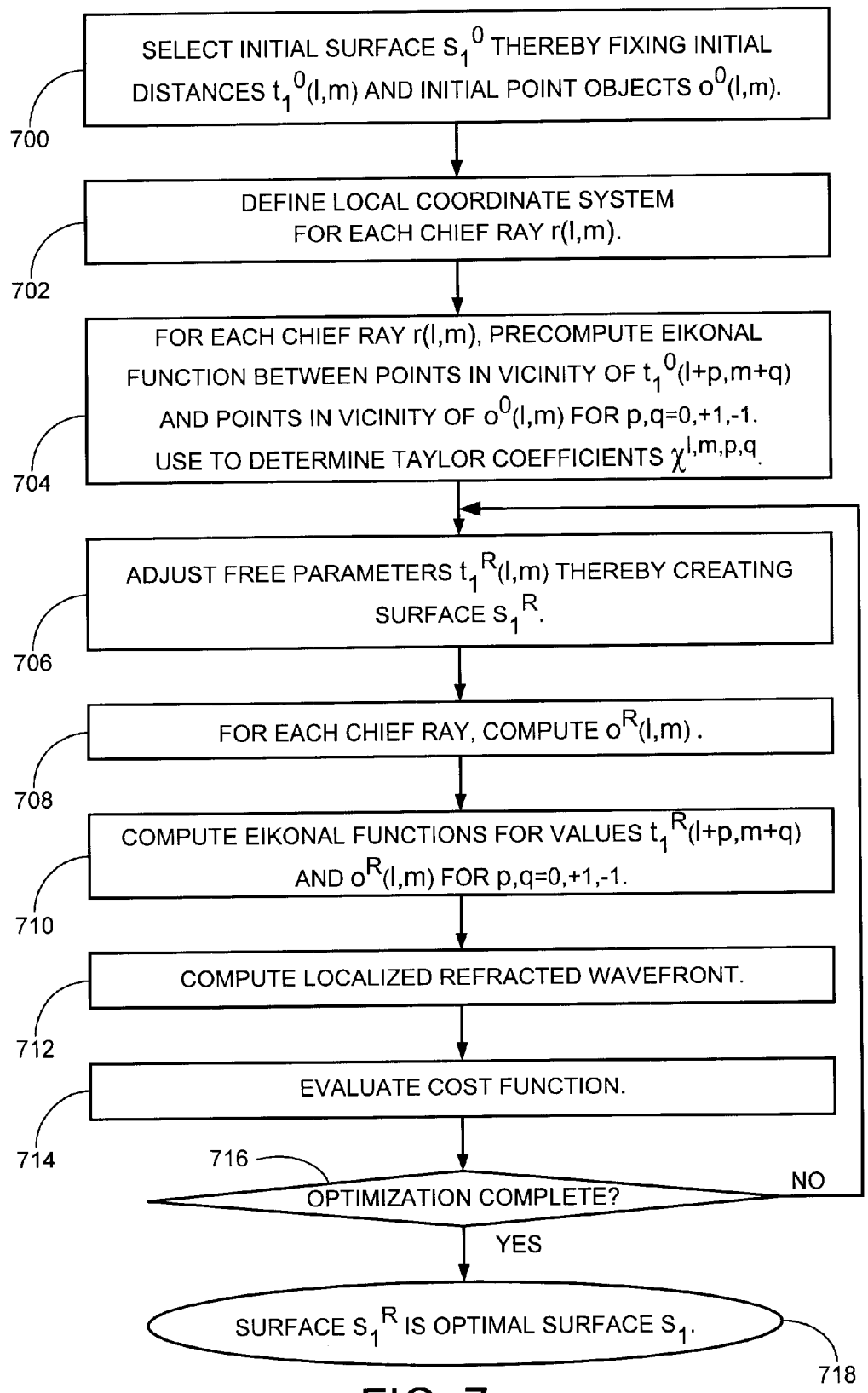
FIG. 7 is a flowchart illustration of the eikonal method for an illustrative, non-limiting example, according to an embodiment of the present invention.

Another possibility is to compute the derivatives analytically, which can accelerate the optimization process dramatically. Applicants discovered that the eikonal method (step 504) enables this analytical computation of derivatives, as will now be described in detail using an illustrative, non-limiting example. The cost function involves power, astigmatism, prism, and thickness of the lens and the gradients thereof. We have already shown that power and astigmatism can be expressed in terms of the Taylor coefficients as in Equation 2. The prism can also be expressed in terms of the Taylor coefficients. The eikonal method enables the Taylor coefficients to be expressed explicitly in terms of the problem parameters. Clearly the thickness of the lens is also expressed explicitly in terms of the problem parameters. Therefore the derivatives of the cost function can by analytically computed. Reference is now made to FIG. 6, which is a schematic illustration of a chief ray r(l,m) and surfaces $S_1, S_2, \ldots, S_k$ of an optical element, according to an embodiment of the present invention. In this specific example, the surfaces $S_2, \ldots, S_k$ are assumed to be known and fixed, while the surface $S_1$ is to be optimized with respect to a cost function. The refraction index in the region between $S_1$ and the eye is denoted $n_0$, and the refraction index in the region between $S_1$ and $S_2$ is denoted $n_1$. Reference is also made to FIG. 7, which is a flowchart illustration of the eikonal method for the current non-limiting example, according to an embodiment of the present invention.

The design method begins with an initial choice for $S_1$ denoted by $S_1^0$ (step 700). Each chief ray r(l,m) is traced from an origin O (a central point in the eye) through the optical element until a point object $o^0(l,m)$. The point object $o^0(l,m)$ lies on a sphere 600 centered at the origin O and having a radius of fixed distance $|o(l,m)|$. This distance is fixed by the viewing angle of the chief ray r(l,m). The distance from the origin O to the intersection point of the chief ray r(l,m) with $S_1^0$ is denoted $t_1^0(l,m)$. The direction vector of the chief ray r(l,m) is denoted $\hat{\tau}(l,m)$. The set $\{t_1^0(l,m), \hat{\tau}(l,m)\}$ fully provides a discrete form of the initial surface $S_1^0$. The choice of initial surface $S_1^0$ fixes the initial distances $t_1^0(l,m)$ and the initial point objects $o^0(l,m)$.

For each chief ray r(l,m) a local orthogonal coordinate system having one of its axes in the direction of $\hat{\tau}(l,m)$ is defined (step 702). It will be appreciated that this is the local coordinate system $(\hat{\xi}^{REF}, \hat{\eta}^{REF}, \hat{\zeta}^{REF})$ of FIG. 4. It should be noted that this coordinate system is independent of the value of $t_1^0(l,m)$, and therefore it will remain fixed throughout the-optimization process.

The eikonal function E is classically defined as the optical distance between two points. For the spherical wavefront emitted by the point object $o^0(l,m)$, the shape of the refracted wavefront at the surface $S_1^0$ can be calculated from the eikonal function between $o^0(l,m)$ and $t_1^0(l+p,m+q)$ for all combinations of $p,q=0,\pm1$. Thus in this preferred embodiment, each point object $o^0(l,m)$ has nine eikonal functions, $E(t_1^0(l+p,m+q), o^0(l,m))$ for all combinations of $p,q=0,\pm1$, associated with it. Since the surfaces $S_2, \ldots, S_k$ are known, Fermat's principle (also known as the principle of least time) can be used to calculate the distance of the optimal optical path (i.e. the eikonal function) between $o^0(l,m)$ and $t_1^0(l+p,m+q)$ for all combinations of $p,q=0,\pm1$ (step 704).

In the optimization process, the surface $S_1$ might deform from its initial shape $S_1^0$. In other words, the initial values $t_1^0(l,m)$ might change into, say, $t_1(l,m)$. Consequently, the associated point objects $o^0(l,m)$ might vary too into $o(l,m)$. However, since the chief ray r(l,m) below the surface $S_1$ has not changed its viewing angle, the new point object is confined to the sphere 600 of radius $|o(l,m)|$.

It is necessary at each step of the optimization process to calculate the shape of the refracted wavefront at the surface $S_1$ due to the spherical wavefront emitted by the point object $o(l,m)$. This will be accomplished by calculating the eikonal function between $o(l,m)$ and $t_1(l+p,m+q)$ for all combinations of $p,q=0,\pm1$ (nine eikonal functions in all). If surface $S_1$ is not too deformed from the initial surface $S_1^0$, then the eikonal function between $o(l,m)$ and a particular $t_1(l+p,m+q)$ can be expressed using a local Taylor expansion in the following form:

$$E(t_1^{p,q}, o) = E(t_1^0(l+p, m+q), o^0(l,m)) + \quad \text{(Eq. 4)}$$
$$\chi_1^{l,m,p,q}(t_1^{p,q} - t_1^0(l+p, m+q)) +$$
$$\sum_{j=1}^{3} \chi_{2,j}^{l,m,p,q}(o_j - o_j^0(l,m)) +$$
$$\chi_3^{l,m,p,q}(t_1^{p,q} - t_1^0(l+p, m+q))^2 +$$
$$\sum_{j=1}^{3} \chi_{4,j}^{l,m,p,q}(t_1^{p,q} - t_1^0(l+p, m+q))(o_j - o_j^0(l,m)) +$$
$$\sum_{\substack{i,j=1 \\ i \leq j}}^{3} \chi_{5,ij}^{l,m,p,q}(o_i - o_i^0(l,m))(o_j - o_j^0(l,m))$$

where the Taylor coefficients are denoted by $\chi_1^{l,m,p,q}, \chi_{2,1}^{l,m,p,q}, \chi_{2,2}^{l,m,p,q}, \chi_{2,3}^{l,m,p,q}, \chi_3^{l,m,p,q}, \chi_{4,1}^{l,m,p,q}, \chi_{4,2}^{l,m,p,q},$ $\chi_{4,3}^{l,m,p,q}, \chi_{5,11}^{l,m,p,q}, \chi_{5,12}^{l,m,p,q}, \chi_{5,13}^{l,m,p,q}, \chi_{5,22}^{l,m,p,q}, \chi_{5,23}^{l,m,p,q}$ and $\chi_{5,33}^{l,m,p,q}, t_1^{p,q}$ denotes $t_1(l+p,m+q)$, o denotes $o(l,m)$ and $o_j$ denotes the j-th component of o.

However, the Taylor coefficients need to be determined in advance. Fermat's principle is used to calculate the value of the eikonal function between any point o in the vicinity of $o^0(l,m)$ and any point $t_1^{p,q}$ in the vicinity of $t_1^0(l+p,m+q)$ (step 704). For each combination of $p,q=0,\pm1$, these eikonal values are then substituted into Equation 4, thus providing systems of equations for the unknown Taylor coefficients that can easily be solved, for example by the least squares method. The number of eikonal values calculated in step 704 is greater than the number of unknown coefficients, to ensure accuracy and stability.

The design process consists, therefore, of finding for each (l,m) the values $t_1(l,m)$ along the chief rays that optimize the cost function and the corresponding point objects $o(l,m)$. Eventually it will be shown that the point object $o(l,m)$ is determined by the $t_1(l+p,m+q)$ values. So, in fact, the free variables for optimization are the points in the set $t_1(l,m)$.

The optimization process is iterative. Consider the R th step in the iteration. The surface $S_1$ has the shape $S_1^R$ parameterized by the collection $t_1^R(l,m)$ (step 706). For each l,m, the point object $o^R(l,m)$ associated with the chief ray whose direction vector is $\hat{\tau}(l,m)$ needs to be computed (step 708). The computation of step 708 uses the local coordinate system defined in step 702. Having found $o^R(l,m)$, Equation 4 is used to compute $E(t_1^R(l+p,m+q), o^R(l,m))$ for all combinations of $p,q=0,\pm1$ (step 710), and from these values, the local shape of the wavefront is computed (step 712), which in turn is used to evaluate the cost function (step 714). If the cost function is not sufficiently optimized (step 716) then the method continues from step 706, with the next iteration of the optimization process. If, however, the cost function is sufficiently optimized (step 716) according to some predetermined criteria, then the shape $S_1^R$ parameterized by the collection $t_1^R(l,m)$ defines the optimized surface $S_1$ (step 718).

Step 708, in which the new point object $o^R(l,m)$ for each chief ray is computed, will now be explained in more detail.

The new point object $o^R(l,m)$ could be found by tracing the chief ray $r(l,m)$ through the modified optical element. But this will result in a very complex dependence of $o^R(l,m)$ on the free variables $t_1^R(l,m)$. Therefore, an alternative approach is used which utilizes the local nature of the entire problem and, in particular, the precomputed eikonal function, to develop the following simple equation for the $o^R(l,m)$:

$$\epsilon^{l,m} = -n_0 \omega^{l,m}, \quad \text{(Eq. 5)}$$

where the 2-dimensional vectors $\epsilon^{l,m}$ and $\omega^{l,m}$ are defined as follows:

$$\epsilon_n^{l,m} = \sum_{p,q=\pm 1,0} t_1^R(l+p, m+q) \cdot b_{l,m}^{(n)}(p,q) \cdot e_{l,m}^{p,q} \text{ and} \quad \text{(Eq. 6)}$$

$$\omega_n^{l,m} = \sum_{p,q=\pm 1,0} t_1^R(l+p, m+q) \cdot b_{l,m}^{(n)}(p,q) \cdot w_{l,m}^{p,q}. \quad \text{(Eq. 7)}$$

for $n=1,2$.

The vectors $\epsilon^{l,m}$ and $\omega^{l,m}$ involve the following fixed geometrical quantities:

$$b_{l,m}^{(1)}(p,q) = \hat{\xi}^{REF}(l,m) \cdot \hat{\zeta}^{REF}(l+p, m+q) \quad \text{(Eq. 8)}$$

$$b_{l,m}^{(2)}(p,q) = \hat{\eta}^{REF}(l,m) \cdot \hat{\zeta}^{REF}(l+p, m+q)$$

$$b_{l,m}^{(3)}(p,q) = \hat{\zeta}^{REF}(l+p, m+q) \cdot \hat{\zeta}^{REF}(l,m)$$

and also involve the quantities $$w_{l,m}^{p,q} \text{ and } e_{l,m}^{p,q},$$

which are defined as follows:

$$w_{l,m}^{p,q} = t_1^R(l+p, m+q) \cdot b_{l,m}^{(3)}(p,q) - t_1^R(l,m) \quad \text{(Eq. 9)}$$

and $$e_{l,m}^{p,q} = E(t_1^R(l+p, m+q), o^R(l,m)) - E(t_1^R(l,m), o^R(l,m)). \quad \text{(Eq. 10)}$$

Equation 5 is an equation for the new point object $o^R(l,m)$ through the eikonal functions of Equation 10.

The coefficients of the local wavefront are given explicitly by:

$$\alpha^{l,m} = [A^{l,m}]^{-1}(n_0 W^{l,m} + E^{l,m}), \quad \text{(Eq. 11)}$$

where $\alpha^{l,m}$ is the three-dimensional vector whose entries are the Taylor coefficients $$(\alpha_{11}^{l,m}, \alpha_{12}^{l,m}, \alpha_{22}^{l,m})$$

of the refracted wavefront. Equation 11 involves the following 3×3 matrix $W^{l,m}$ and three-dimensional vectors $A^{l,m}$ and $E^{l,m}$:

$$A^{l,m} = \begin{bmatrix} \sum_{p,q=0,\pm 1} (A_{1,1}^{l,m,p,q})^2 t^4 & \sum_{p,q=0,\pm 1} A_{1,1}^{l,m,p,q} A_{1,2}^{l,m,p,q} t^4 & \sum_{p,q=0,\pm 1} A_{1,1}^{l,m,p,q} A_{2,2}^{l,m,p,q} t^4 \\ \sum_{p,q=0,\pm 1} A_{1,1}^{l,m,p,q} A_{1,2}^{l,m,p,q} t^4 & \sum_{p,q=0,\pm 1} (A_{1,1}^{l,m,p,q})^2 t^4 & \sum_{p,q=0,\pm 1} A_{1,2}^{l,m,p,q} A_{2,2}^{l,m,p,q} t^4 \\ \sum_{p,q=0,\pm 1} A_{1,1}^{l,m,p,q} A_{2,2}^{l,m,p,q} t^4 & \sum_{p,q=0,\pm 1} A_{1,2}^{l,m,p,q} A_{2,2}^{l,m,p,q} t^4 & \sum_{p,q=0,\pm 1} (A_{2,2}^{l,m,p,q})^2 t^4 \end{bmatrix}, \quad \text{(Eq. 12A)}$$

where $t^4$ is a shortened notation for $$(t_1^R(l+p, m+q))^4,$$

$$W^{l,m} = \begin{bmatrix} \sum_{p,q=0,\pm 1} (t_1^R(l+p, m+q))^2 A_{1,1}^{l,m,p,q} w_{l,m}^{p,q} \\ \sum_{p,q=0,\pm 1} (t_1^R(l+p, m+q))^2 A_{1,2}^{l,m,p,q} w_{l,m}^{p,q} \\ \sum_{p,q=0,\pm 1} (t_1^R(l+p, m+q))^2 A_{2,2}^{l,m,p,q} w_{l,m}^{p,q} \end{bmatrix}, \text{ and} \quad \text{(Eq. 12B)}$$

$$E^{l,m} = \begin{bmatrix} \sum_{p,q=0,\pm 1} (t_1^R(l+p, m+q))^2 A_{1,1}^{l,m,p,q} e_{l,m}^{p,q} \\ \sum_{p,q=0,\pm 1} (t_1^R(l+p, m+q))^2 A_{1,2}^{l,m,p,q} e_{l,m}^{p,q} \\ \sum_{p,q=0,\pm 1} (t_1^R(l+p, m+q))^2 A_{2,2}^{l,m,p,q} e_{l,m}^{p,q} \end{bmatrix}, \quad \text{(Eq. 12C)}$$

where the canonical quantities $$A_{1,1}^{l,m,p,q}, A_{1,2}^{l,m,p,q}, A_{2,2}^{l,m,p,q}$$

are defined as follows:

$$A_{1,1}^{l,m,p,q} = (b_{l,m}^{(1)}(p,q))^2 \quad \text{(Eq. 13)}$$

$$A_{1,2}^{l,m,p,q} = b_{l,m}^{(1)}(p,q) b_{l,m}^{(2)}(p,q)$$

$$A_{2,2}^{l,m,p,q} = (b_{l,m}^{(2)}(p,q))^2.$$

Equation 5 and Equation 11, which are derived in Appendix A, are the fundamental equations in the novel eikonal method. They provide explicit expressions for the point objects $o^R(l,m)$ and for the form of the local wavefront for each chief ray $r(l,m)$. The equations contain a number of geometrical quantities such as $$b_{l,m}^{(1)}, b_{l,m}^{(2)}, b_{l,m}^{(3)} \text{ and } A_{1,1}^{l,m,p,q}, A_{1,2}^{l,m,p,q}, A_{2,2}^{l,m,p,q}$$

that can be precomputed at the initial stage and then stored in memory.

It might happen that during the iterative optimization process the surface $S_1$ will deform appreciably from its initial shape $S_1^0$, and therefore the use of Equation 4 for the calculation of the local wavefront is no longer appropriate.

Applicants have discovered that, in this case, it is preferable to recompute the eikonal function for points in the vicinity of the new surface $S_1$ and to restart the process. It should be noted, though, that the eikonal function is computed only a small number of times in the iterative process.

It will be appreciated by persons skilled in the art that the present invention is not limited by what has been particularly shown and described herein above. Rather the scope of the invention is defined by the claims that follow Appendix A:

APPENDIX A

This appendix is a derivation of Equations 5 and 11, relating the point objects $o^R(l,m)$ and the coefficients of the refracted wavefronts to the free variables $t_1^R(l,m)$ for the R th step in the iteration of the optimization process.

Figure 8:
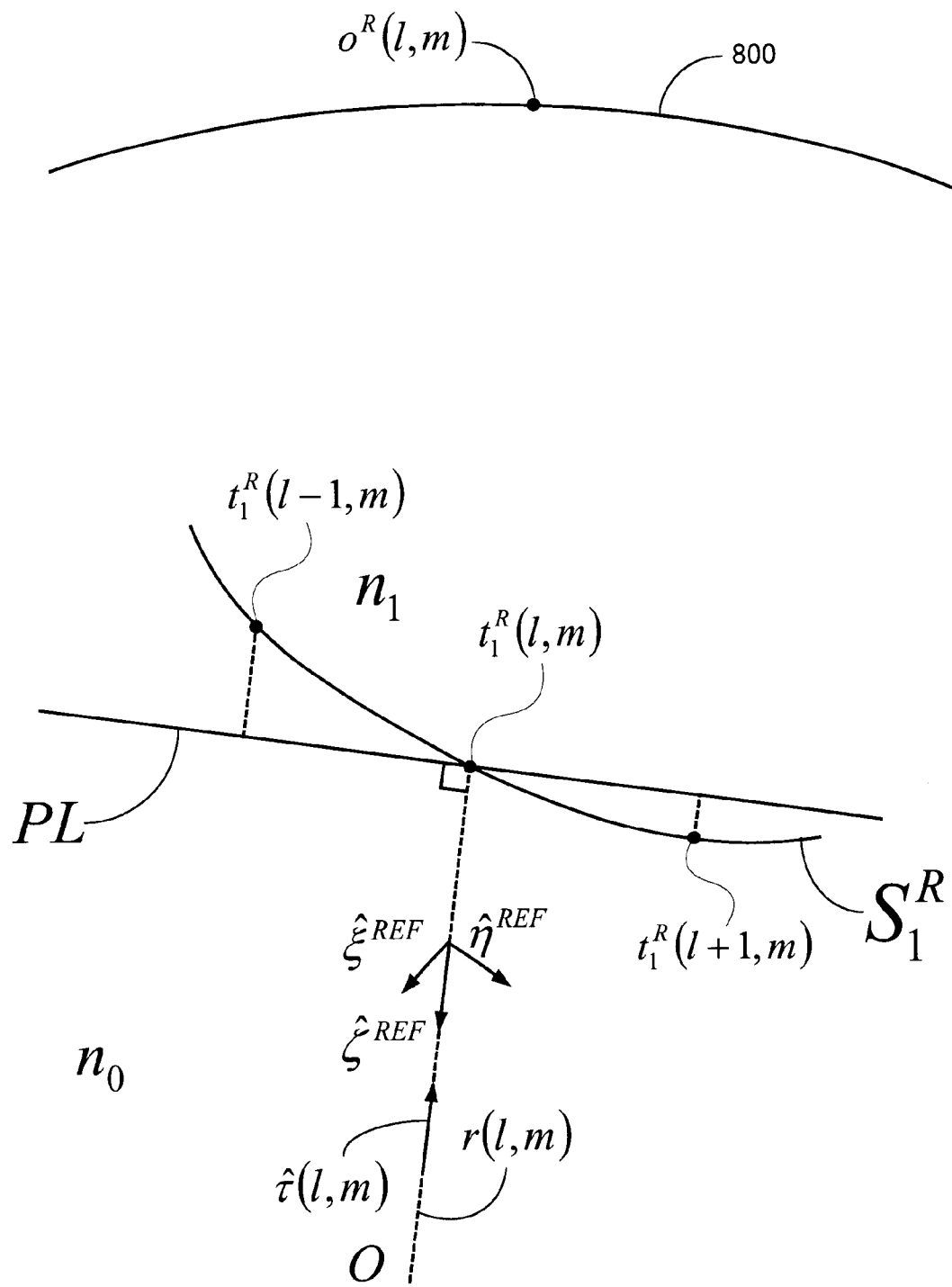
FIG. 8 is a schematic illustration of the surface $S_1^R$ and a chief ray passing therethough, according to an embodiment of the present invention; and Appendix A is a derivation of equations for point objects and wavefronts used in the eikonal method of FIG. 7.

Reference is now made to FIG. 8, which is a schematic illustration of the surface $S_1^R$ and a chief ray r(l,m) passing therethough, according to a preferred embodiment of the present invention. The chief ray intersects a sphere 800 at the point object $o^R(l,m)$.

In order that the wavefront originating at the point object $o^R(l,m)$ propagates in the direction of the chief ray r(l,m), and thus is exactly aimed at a central point O in the eye, it must be that the normal to the wavefront at $t_1^R(l,m)$ is in the direction of $\hat{\tau}(l,m)$. This condition is translated to a condition on the point object $o^R(l,m)$. For this purpose the plane PL orthogonal to $\hat{\tau}(l,m)$ at $t_1^R(l,m)$ is considered. The eikonal functions for points on that plane are evaluated.

The eikonal function E in the plane PL is now expressed in the orthogonal local coordinate system $(\hat{\xi}^{REF},\hat{\eta}^{REF},\hat{\zeta}^{REF})$ that is already defined there. The restriction of E to the plane PL in these coordinates is denoted by $\sigma(\xi,\eta)$. $\sigma(\xi,\eta)$ is evaluated by solving the classical eikonal differential equation. The values of E at the points $t_1^R(l+p,m+q)$ for $p,q=0,\pm 1$ are the initial conditions for the differential equation. Equivalently, $\sigma(\xi,\eta)$ can be computed by adding to the above-mentioned initial values the optical distance along the rays emanating from each of the $t_1^R(l+p,m+q)$ points until the rays intersect the plane PL.

A simple geometrical calculation then provides that the orthogonal projection of the points $t_1^R(l+p,m+q)$ onto the plane PL is given by:

$$(\xi_{l,m}^{p,q}, \eta_{l,m}^{p,q}) = t_1^R(l+p, m+q)(b_{l,m}^{(1)}(p,q), b_{l,m}^{(2)}(p,q)), \quad (Eq. A1)$$

where the geometrical quantities $$b_{l,m}^{(1)}, b_{l,m}^{(2)}, b_{l,m}^{(3)}$$

are defined in Equation 8:

$$b_{l,m}^{(1)}(p,q) = \hat{\xi}^{REF}(l,m) \cdot \hat{\zeta}^{REF}(l+p,m+q)$$
$$b_{l,m}^{(2)}(p,q) = \hat{\eta}^{REF}(l,m) \cdot \hat{\zeta}^{REF}(l+p,m+q) \quad (Eq. 8)$$
$$b_{l,m}^{(3)}(p,q) = \hat{\zeta}^{REF}(l+p,m+q) \cdot \hat{\zeta}^{REF}(l,m).$$

The condition on the point object $o^R(l,m)$ is that the normal to the wavefront at $t_1^R(l,m)$ is in the direction $\hat{\zeta}^{REF}(l,m)$. This is equivalent to the condition:

$$\left(\frac{\partial \sigma}{\partial \xi}\right)\bigg|_{(0,0)} = \left(\frac{\partial \sigma}{\partial \eta}\right)\bigg|_{(0,0)} = 0. \quad (Eq. A2)$$

The Euclidean distance between a point $t_1^R(l+p,m+q)$ and its projection onto the plane PL is given by:

$$w_{l,m}^{p,q} = t_1^R(l+p, m+q)b_{l,m}^{(3)}(p,q) - t_1^R(l,m) \quad (Eq. 9)$$

It follows that, to linear order, the optical distance between point $t_1^R(l+p,m+q)$ and the plane PL is $$n_0 w_{l,m}^{p,q}.$$

Since the condition of Equation A2 holds, to linear order, the following equation is obtained:

$$\sigma(\xi_{l,m}^{p,q}, \eta_{l,m}^{p,q}) - \sigma(0,0) = 0. \quad (Eq. A3)$$

In particular, the equivalence holds for the projected points defined in Equation A1:

$$\sigma(\xi_{l,m}^{p,q}, \eta_{l,m}^{p,q}) - E(t_1^R(l,m), o^R(l,m)) = 0. \quad (Eq. A4)$$

The left side of Equation A4 is precisely the difference between the eikonal values at $t_1^R(l+p,m+q)$ and at $t_1^R(l,m)$, plus the optical distance between $t_1^R(l+p,m+q)$ and its projection onto the plane PL. Thus using the optical distance calculated above, the following equation is obtained:

$$n_0 w_{l,m}^{p,q} + e_{l,m}^{p,q} = 0, \quad (Eq. A5)$$

where $$w_{l,m}^{p,q}$$

is defined in Equation 9, and $$e_{l,m}^{p,q}$$

is defined in Equation 10:

$$e_{l,m}^{p,q} = E(t_1^R(l+p,m+q), o^R(l,m)) - E(t_1^R(l,m), o^R(l,m)). \quad (Eq. 10)$$

Equation A5 is a system of 9 equations for the unknown point object $o^R(l,m)$. There are many ways to stabilize it, for example, a least squares approximation. An alternative, natural way to solve the overdetermined system of Equation A5 is to replace Equation A3 by the following:

$$\sigma(\xi_{l,m}^{p,q}, \eta_{l,m}^{p,q}) - \sigma(0,0) = \xi \cdot \frac{\partial \sigma}{\partial \xi}\bigg|_{(0,0)} + \eta \cdot \frac{\partial \sigma}{\partial \eta}\bigg|_{(0,0)}. \quad (Eq. A6)$$

Equation A6 is applied at the projected points, and using the linear-order optical distance, the following is obtained:

$$(t_1^R(l+p, m+q)b_{l,m}^{(1)}(p,$$ (Eq. A7)

$$q)) \cdot \frac{\partial \sigma}{\partial \xi}\bigg|_{(0,0)} + (t_1^R(l+p, m+q)b_{l,m}^{(2)}(p, q)) \cdot \frac{\partial \sigma}{\partial \eta}\bigg|_{(0,0)} =$$

$$n_0 w_{l,m}^{p,q} + e_{l,m}^{p,q},$$

where p,q=0,±1.

Eq. A7 forms an overdetermined system of 9 equations in the two unknowns $$\frac{\partial \sigma}{\partial \xi}\bigg|_{(0,0)} \text{ and } \frac{\partial \sigma}{\partial \eta}\bigg|_{(0,0)}$$

considering for the moment the unknown point object $o^R(l,m)$ as a parameter). This overdetermined system can be converted naturally to a 2×2 system by the method of least squares.

The normal equations for the least squares method can be written explicitly. It is convenient at this stage to introduce for each quadruple l,m,p,q the canonical 2×2 matrices:

$$BSKL_{i,j}^{l,m,p,q} = b_{l,m}^{(i)}(p,q)b_{l,m}^{(j)}(p,q), \text{ for } i, j = 1, 2.$$ (Eq. A8)

The matrix $B^{l,m}$ is also defined. Its i,j entry is given by:

$$B_{i,j}^{l,m} = \sum_{p,q=\pm 1,0} (t_1^R(l+p, m+q))^2 BSKL_{i,j}^{l,m,p,q}.$$ (Eq. A9)

The normal equations for the least squares approximation of Equation A7 are:

$$B^{l,m}\nabla\sigma(0,0) = n_0\omega^{l,m} + \epsilon^{l,m},$$ (Eq. A10)

where $$\nabla\sigma(0,0) = \left(\frac{\partial \sigma}{\partial \xi}, \frac{\partial \sigma}{\partial \eta}\right)\bigg|_{(0,0)},$$

and where the 2-dimensional vectors $\epsilon^{l,m}$ and $\omega^{l,m}$ are defined in Equations 6 and 7, respectively:

$$\epsilon_n^{l,m} = \sum_{p,q=\pm 1,0} t_1^R(l+p, m+q) \cdot b_{l,m}^{(n)}(p,q) \cdot e_{l,m}^{p,q}$$ (Eq. 6)

and $$\omega_n^{l,m} = \sum_{p,q=\pm 1,0} t_1^R(l+p, m+q) \cdot b_{l,m}^{(n)}(p,q) \cdot w_{l,m}^{p,q},$$ (Eq. 7)

for n=1,2.

Imposing now the condition $\nabla\sigma(0,0)=0$, Equation 5 is obtained for the two components of the point object $o^R(l,m)$:

$$\epsilon^{l,m} = -n_0\omega^{l,m}.$$ (Eq. 5)

It is useful at this stage to point out certain computational aspects. Firstly, the geometrical matrices $$BSKL_{i,j}^{l,m,p,q}$$

and $B^{l,m}$ are not used at all. Secondly, the right side of Equation 5 is a quadratic explicit expression in the variables $t_1^R$, and does not depend at all on the point objects. Thirdly, the geometric quantities $$b_{l,m}^{(1)}, b_{l,m}^{(2)}, b_{l,m}^{(3)}$$

depend only on the directions of the chief rays and are therefore computed only once (at the initial stage) and stored in memory. Finally, the vectors $\epsilon^{l,m}$ depend on the point objects $o^R(l,m)$ quadratically through the local expansion of the eikonal function. Therefore, the point object $o^R(l,m)$ can be expressed explicitly in terms of the variables $t_1^R(l,m)$.

Determining the point object $o^R(l,m)$ via Equation 5 implies that the linear terms in the expansion of the eikonal $\sigma(\xi,\eta)$ vanish. Therefore, to leading order, the local expansion takes the form:

$$\sigma(\xi,\eta) - \sigma(0,0) = \alpha_{11}(l,m)\xi^2 + \alpha_{12}(l,m)\xi\eta + \alpha_{22}(l,m)\eta^2.$$ (Eq. A11)

The local quadratic expansion of Equation A11 is precisely the local expansion for the wavefront passing through $t_1^R(l,m)$.

By substituting Equation A1 into Equation A11 and using the fact that $$\sigma(\xi_{l,m}^{p,q}, \eta_{l,m}^{p,q}) - \sigma(0,0) = n_0 w_{l,m}^{p,q} + e_{l,m}^{p,q},$$

one obtains the following:

$$n_0 w_{l,m}^{p,q} + e_{l,m}^{p,q} =$$ (Eq. A12)

$$(t_1^R(l+p, m+q))^2 \cdot \begin{bmatrix} (b_{l,m}^{(1)}(p,q))^2 \alpha_{11}(l,m) + \\ b_{l,m}^{(1)}(p,q)b_{l,m}^{(2)}(p,q)\alpha_{12}(l,m) + \\ (b_{l,m}^{(2)}(p,q))^2 \alpha_{22}(l,m) \end{bmatrix}.$$

By defining the following canonical quantities as in Equation 13 in the detailed description:

$$A_{1,1}^{l,m,p,q} = (b_{l,m}^{(1)}(p,q))^2$$ (Eq. 13)

$$A_{1,2}^{l,m,p,q} = b_{l,m}^{(1)}(p,q)b_{l,m}^{(2)}(p,q)$$

$$A_{2,2}^{l,m,p,q} = (b_{l,m}^{(2)}(p,q))^2,$$

Equation A12 can now be written compactly in the following form:

$$n_0 w_{l,m}^{p,q} + e_{l,m}^{p,q} =$$ (Eq. A13)

$$(t_1^R(l+p, m+q))^2 \cdot [A_{1,1}^{l,m,p,q}\alpha_{11}^{l,m} + A_{1,2}^{l,m,p,q}\alpha_{12}^{l,m} + A_{2,2}^{l,m,p,q}\alpha_{22}^{l,m}],$$

for p,q=0,±1.

Eq. A13 forms an overdetermined system of 9 equations in 3 unknowns ($\alpha_{ij}(l,m)$). In order to write down the normal equations for the least squares approximation for its solution, the following 3×3 matrix $A^{l,m}$ and three-dimensional vectors $W^{l,m}$ and $E^{l,m}$ are defined in Equation 12 of the detailed description:

$$A^{l,m} = \begin{bmatrix} \sum_{p,q=0,\pm 1} (A_{1,1}^{l,m,p,q})^2 t^4 & \sum_{p,q=0,\pm 1} A_{1,1}^{l,m,p,q} A_{1,2}^{l,m,p,q} t^4 & \sum_{p,q=0,\pm 1} A_{1,1}^{l,m,p,q} A_{2,2}^{l,m,p,q} t^4 \\ \sum_{p,q=0,\pm 1} A_{1,1}^{l,m,p,q} A_{1,2}^{l,m,p,q} t^4 & \sum_{p,q=0,\pm 1} (A_{1,1}^{l,m,p,q})^2 t^4 & \sum_{p,q=0,\pm 1} A_{1,2}^{l,m,p,q} A_{2,2}^{l,m,p,q} t^4 \\ \sum_{p,q=0,\pm 1} A_{1,1}^{l,m,p,q} A_{2,2}^{l,m,p,q} t^4 & \sum_{p,q=0,\pm 1} A_{1,2}^{l,m,p,q} A_{2,2}^{l,m,p,q} t^4 & \sum_{p,q=0,\pm 1} (A_{2,2}^{l,m,p,q})^2 t^4 \end{bmatrix}$$ (Eq. 12A)

where $t^4$ is a shortened notation for $(t_1^R(l+p,m+q))^4$, $$W^{l,m} = \begin{bmatrix} \sum_{p,q=0,\pm 1} (t_1^R(l+p,m+q))^2 A_{1,1}^{l,m,p,q} w_{l,m}^{p,q} \\ \sum_{p,q=0,\pm 1} (t_1^R(l+p,m+q))^2 A_{1,2}^{l,m,p,q} w_{l,m}^{p,q} \\ \sum_{p,q=0,\pm 1} (t_1^R(l+p,m+q))^2 A_{2,2}^{l,m,p,q} w_{l,m}^{p,q} \end{bmatrix}, \text{ and}$$ (Eq. 12B)

$$E^{l,m} = \begin{bmatrix} \sum_{p,q=0,\pm 1} (t_1^R(l+p,m+q))^2 A_{1,1}^{l,m,p,q} e_{l,m}^{p,q} \\ \sum_{p,q=0,\pm 1} (t_1^R(l+p,m+q))^2 A_{1,2}^{l,m,p,q} e_{l,m}^{p,q} \\ \sum_{p,q=0,\pm 1} (t_1^R(l+p,m+q))^2 A_{2,2}^{l,m,p,q} e_{l,m}^{p,q} \end{bmatrix},$$ (Eq. 12C)

The normal equations are then given by:

$$A^{l,m}\alpha^{l,m} = n_0 W + E$$ (Eq. A14)

where $\alpha^{l,m}$ is the three-dimensional vector whose entries are the Taylor coefficients $$(\alpha_{11}^{l,m}, \alpha_{12}^{l,m}, \alpha_{22}^{l,m})$$

of the refracted wavefront. The coefficients of the local wavefront are given explicitly by Equation 11 of the detailed description:

$$\alpha^{l,m} = [A^{l,m}]^{-1}(n_0 W + E).$$ (Eq. 11)

What is claimed is:

1. A method for designing at least one surface of an ophthalmic lens, the method comprising the steps of:
    representing said at least one surface with parameters;
    choosing a function in said parameters, said function including a term involving the difference between the astigmatism induced by said ophthalmic lens and a predetermined astigmatism distribution, said difference being raised to an exponent having a value other than 2; and
    optimizing said function with respect to said parameters.

2. The method of claim 1, wherein said ophthalmic lens is a multifocal progressive lens.

3. An ophthalmic lens having two or more surfaces, wherein at least one of said surfaces is designed by the method of claim 1.

4. A method for designing at least one surface of an ophthalmic lens, the method comprising the steps of:
    receiving a prescription of a specific wearer for said ophthalmic lens;
    representing said at least one surface with parameters;
    choosing a function in said parameters, said function including a term involving the difference between the prism induced by said ophthalmic lens and a predetermined prism distribution related to said prescription; and
    optimizing said function with respect to said parameters.

5. The method of claim 4, wherein said ophthalmic lens is a multifocal progressive lens.

6. An ophthalmic lens having two or more surfaces, wherein at least one of said surfaces is designed by the method of claim 4.

7. A method for designing at least one surface of an ophthalmic lens, the method comprising the steps of:
    representing said at least one surface with parameters;
    choosing a function in said parameters, said function including a term involving the difference between the gradient of a characteristic and the gradient of a predetermined characteristic distribution, said characteristic selected from a group including: optical power, optical astigmatism, and optical prism; and
    optimizing said function with respect to said parameters.

8. The method of claim 7, wherein said ophthalmic lens is a multifocal progressive lens.

9. An ophthalmic lens having two or more surfaces, wherein at least one of said surfaces is designed by the method of claim 7.

10. A method for designing at least one surface of an ophthalmic lens, the method comprising the steps of:
    representing said at least one surface with parameters;
    choosing a function in said parameters, said function including the square of the difference between the power induced by said ophthalmic lens and a predetermined power distribution and other terms related to the power induced by said ophthalmic lens; and
    optimizing said function with respect to said parameters.

11. The method of claim 10, wherein said ophthalmic lens is a multifocal progressive lens.

12. The method of claim 10, wherein said other terms related to the power induced by said ophthalmic lens include terms of the form $|P(l,m) - P_v(l,m)|^\beta$ for at least one value of $\beta$ other than 2, where $P(l,m)$ denotes the power induced by the optical element, $P_v(l,m)$ denotes the predetermined power distribution, and $(l,m)$ parameterize the surfaces of said ophthalmic lens.

13. An ophthalmic lens having two or more surfaces, wherein at least one of said surfaces is designed by the method of claim 10.

14. A method for designing at least one surface of an ophthalmic lens, the method comprising the steps of:
    representing said at least one surface by parameters;
    choosing an astigmatism distribution and an astigmatism direction distribution;
    choosing a function in said parameters, said function including a term involving said astigmatism distribution, said astigmatism direction distribution and the astigmatism induced by said ophthalmic lens; and
    optimizing said function with respect to said parameters.

15. The method of claim 14, wherein said ophthalmic lens is a multifocal progressive lens.

16. The method of claim 14, wherein said astigmatism distribution and said astigmatism direction distribution are determined from a prescription for an eyeglass.

17. The method of claim 14, wherein said term is of the form $$\sum_{l,m} w_1(l, m) \left| \sqrt{(\alpha_{11}(l, m) - \alpha_{22}(l, m) - C_{V,1}(l, m))^2 + w_2 \alpha_{12}^2(l, m)} - C_{V,2}(l, m) \right|^\beta$$

where (l,m) index said parameters for said at least one surface, $C_{v,1}$ is said astigmatism distribution, $C_{v,2}$ is a second astigmatism distribution, $\alpha_{11}$, $\alpha_{12}$ and $\alpha_{22}$ are the coefficients in a quadratic expansion of a wavefront refracted by said lens in a coordinate system chosen for each (l,m) in accordance with said astigmatism direction distribution, $w_1$ and $w_2$ are weight distributions and $\beta$ is an exponent.

18. An ophthalmic lens having two or more surfaces, wherein at least one of said surfaces is designed by the method of claim 14.

19. The method of claim 14, further comprising the step of choosing a power distribution and wherein said function includes at least one term involving said power distribution and the power induced by said ophthalmic lens.

20. The method of claim 19, wherein said ophthalmic lens is a multifocal progressive lens.

21. The method of claim 19, wherein said power distribution, said astigmatism distribution and said astigmatism direction distribution are determined from a prescription for an eyeglass.

22. An ophthalmic lens having two or more surfaces, wherein at least one of said surfaces is designed by the method of claim 19.

23. A method for designing at least one surface of an ophthalmic lens, the method comprising the steps of:
   representing said at least one surface by a method of unconstrained patches to obtain a representation having parameters, said method of unconstrained patches including the steps of:
      selecting a set of discrete points $\{p_i=(X_i,y_i,z_i)\}$;
      approximating said surface in the vicinity of each discrete point $p_i$ by a local polynomial of a predetermined order in the variables x and y; and
      choosing coefficients of said local polynomial that best fit the discrete values of the nearest neighbors to $p_i$ in the set;
   choosing a function in said parameters, said function including a weighted combination of terms involving the difference between the astigmatism induced by said ophthalmic lens and a predetermined astigmatism distribution and terms involving the difference between the power induced by said ophthalmic lens and a predetermined power distribution; and
   optimizing said function with respect to said parameters.

24. An ophthalmic lens having two or more surfaces, wherein at least one of said surfaces is designed by the method of claim 23.

25. A method for designing at least one surface of an ophthalmic lens, the method comprising the steps of:
   representing said at least one surface by parameters;
   choosing a function in said parameters, said function including a weighted combination of terms involving the difference between the astigmatism induced by said ophthalmic lens and a predetermined astigmatism distribution and terms involving the difference between the power induced by said ophthalmic lens and a predetermined power distribution; and
   optimizing said function with respect to said parameters, wherein said step of optimizing comprises the steps of:
      selecting initial values of said parameters to attain an initial lens, wherein said initial lens includes any fixed surfaces of said ophthalmic lens and said at least one surface with said initial values for said parameters;
      computing eikonal functions for said initial lens; and
      computing from said eikonal functions optical characteristics of said initial lens and optical characteristics of lenses including said fixed surfaces and said at least one surface with partially optimized values for said parameters.

26. An ophthalmic lens having two or more surfaces, wherein at least one of said surfaces is designed by the method of claim 25.

27. A method for designing at least one surface of an ophthalmic lens having two or more surfaces, the method comprising the steps of:
   representing said at least one surface by parameters;
   choosing a function in said parameters, said function including a term involving the difference between the astigmatism induced by said ophthalmic lens and a predetermined astigmatism distribution and a term involving the difference between the power induced by said ophthalmic lens and a predetermined power distribution; and
   optimizing said function with respect to said parameters subject to one or more constraints selected from a group including: constraining said surfaces from becoming too close to one another, and constraining said at least one surface or its derivatives or both to prescribed values at a predetermined set of points.

28. An ophthalmic lens having two or more surfaces, wherein at least one of said surfaces is designed by the method of claim 27.

29. A method for simultaneously designing a front surface and a back surface of an ophthalmic lens, the method comprising the steps of:
   selecting chief rays, each of said chief rays associated with a viewing angle of a point object at a predefined distance from a central point in an eye;
   representing said back surface by a first set of distances, each of said first set of distances being the distance of said central point from an intersection point of said back surface with a respective one of said chief rays;
   representing said front surface by a second set of distances, each of said second set of distances being the distance of an intersection point of said front surface with a respective one of said chief rays from the intersection point of said back surface with said respective one of said chief rays;
   expressing said first set of distances and said second set of distances as parameterized functions of said viewing angle;
   choosing a cost function in parameters of said parameterized functions, said cost function including a weighted combination of one or more terms involving the astigmatism induced by said ophthalmic lens and a predetermined astigmatism distribution and one or more terms involving the power induced by said ophthalmic lens and a predetermined power distribution; and optimizing said cost function with respect to said parameters.

30. The method of claim 29, wherein said ophthalmic lens is a multifocal progressive lens.

31. The method of claim 29, wherein said parameterized functions are finite element representations of said distances.

32. An ophthalmic lens having a front surface and a back surface both of which are designed simultaneously by the method of claim 29.

33. The ophthalmic lens of claim 32, wherein said ophthalmic lens is a multifocal progressive lens.

* * * * *